(12) United States Patent
Agrawal et al.

(10) Patent No.: US 11,614,924 B1
(45) Date of Patent: Mar. 28, 2023

(54) SYSTEMS, METHODS, USER INTERFACES, AND DEVELOPMENT ENVIRONMENTS FOR A DATA MANAGER

(71) Applicant: People Center, Inc., San Francisco, CA (US)

(72) Inventors: Ajaya Kumar Agrawal, Karnataka (IN); Ishan Timalsina, Seattle, WA (US); Abhishek Gupta, Uttar Pradesh (IN); Abhishek Bansal, Karnataka (IN); Dipesh Jayantilal Rambhiya, San Ramon, CA (US); Siddhartha Gunda, Milpitas, CA (US); Lei Zhao, San Mateo, CA (US); Kyle Michael Boston, San Carlos, CA (US)

(73) Assignee: PEOPLE CENIER, INC., San Francisco, CA (US)

( * ) Notice: Subject to any disclaimer, the term of this patent is extended or adjusted under 35 U.S.C. 154(b) by 0 days.

(21) Appl. No.: 17/953,746

(22) Filed: Sep. 27, 2022

(30) Foreign Application Priority Data

Jun. 20, 2022 (IN) .............................. 202211035146

(51) Int. Cl.
  *G06F 9/44* (2018.01)
  *G06F 8/34* (2018.01)
  *G06F 8/33* (2018.01)
(52) U.S. Cl.
  CPC . *G06F 8/34* (2013.01); *G06F 8/33* (2013.01)

(58) Field of Classification Search
  None
  See application file for complete search history.

(56) References Cited

U.S. PATENT DOCUMENTS

| 6,636,846 B1* | 10/2003 | Leung | G06F 16/2393 |
| 8,914,404 B1* | 12/2014 | Kim | G06F 16/2358 |
| | | | 707/769 |
| 2006/0041584 A1* | 2/2006 | Debertin | G06F 16/252 |
| 2010/0070480 A1* | 3/2010 | Ahuja | G06F 16/23 |
| | | | 707/703 |
| 2014/0281917 A1* | 9/2014 | Alpern | G06F 40/14 |
| | | | 715/234 |
| 2017/0109390 A1* | 4/2017 | Bradley | G06F 16/335 |

* cited by examiner

*Primary Examiner* — Anna C Deng
(74) *Attorney, Agent, or Firm* — Dority & Manning, P.A.

(57) ABSTRACT

A computer-implemented method includes maintaining one or more databases that collectively store organizational data associated with an organization and an object graph data structure having a plurality of data objects associated with the organizational data. The method further includes generating a formula field which includes one or more dependent fields, wherein the formula field is defined and evaluated using a query expression that makes reference to the object graph data structure. The method further includes, in response to a value of at least one of the one or more dependent fields changing to an updated value, automatically updating a value of the formula field based on the updated value of the at least one of the one or more dependent fields, and enabling inclusion of the formula field in one or more of a report, a policy, a workflow, a trigger, or a rule.

19 Claims, 17 Drawing Sheets

Add a calculated field

You can add a calculated field that is based on the other fields in Rippling. This is a highly customized feature that covers a broad swath of use cases

Field name

[ Employee tenure ]

Field description

[ ]

Formula

*f* Insert function

1  TODAY() - start

FIELDS

Start date                TAB

Start date hours

W2 start date

Access start

Data type

Leave start date

[ Select ]        Policy start date

FIG. 6A

SELECT — 630

Returns a list of values matching a logical condition(s)

Syntax

SELECT(Objects, Field, logical_condition [and/or logical_condition2]...)

Objects: list of objects (i.e. Employees, Payroll) etc.
Field: field to select.
logical_condition: a statement that evaluates to either TRUE or FALSE, which will be evaluated across all employees. Only employees where the condition is TRUE will be counted.

Examples

Scenario: Get all employees in the sales or engineering department with salary less than $100,000.

SELECT( department, SELECT( department, < 100000))

Result: Returns all employees in the sales or engineering department with salary less than $100,000.

Add a calculated field — 602

You can add a calculated field that is based on the other fields in Rippling. This is a highly customized feature that covers a broad swath of use cases Field name — 604

Field description — 606

Formula — 608

$f_x$ Insert function — 610

SELECT( — 632

FIELDS — 634

All Rows

SELECT(Objects, Field,
logical_condition [and/or logical_condition2]...)

Data type — 616

Select

FIG. 11C

ADD A FORMULA FIELD
CREATE A FORMULA FIELD THAT IS CALCULATED FROM YOUR EXISTING RIPPLING DATA. ← 1102

FIELD NAME* ← 1104
[ FIELD NAME ]

FIELD DESCRIPTION ← 1106
[ FIELD DESCRIPTION ]

FORMULA ← 1108
✎ INSERT FUNCTION ⓘ ← 1114
1 SELECT( ) ← 1142                                    ○ INVALID ⓘ

FIELDS                                    [TAB]
    [x] ALL_ROWS                              ← 1146

SELECT(DATA_SET, FIELD,
    LOGICAL_CONDITION [AND|OR
    LOGICAL_CONDITION_2]...
    )                                         ← 1144

GET HELP W| ← 1110

DATA TYPE*
[ AUTO-DETECT                         ▷ ]

IF THIS REPORT IS AGGREGATED, THIS FIELD WILL BE CALCULATED* ⓘ ← 1112
[ PRE-AGGREGATION (RECOMMENDED)       ▷ ]

---

⎫ ← 1150
⎬
⎭ ← 1158

SELECT

RETURNING A LIST OF VALUES THAT MATCH THE LOGICAL CONDITION(S).

SYNTAX

SELECT(DATA_SET, FIELD, LOGICAL_CONDITION [AND|OR LOGICAL_CONDITION_2],...)

DATA_SET: THE DATASET THAT CONTAINS THE VALUES YOU WANT TO ANALYZE. SELECT THE MODULE THAT HAS THE VALUES YOU WANT TO USE, SUCH AS EMPLOYEE, DEVICES, PAYROLL, OR JIRA.

FIELD: THE VALUE FROM THE DATA_SET YOU WANT TO BE RETURNED IN THE LIST. THIS IS TYPICALLY AN EMPLOYEE ATTRIBUTE SUCH AS TITLE, BUT CAN ALSO BE A CALCULATED VALUE THAT USES FIELDS FROM WITHIN THE DATA_SET, SUCH AS TODAY() + START_DATE THE DATA_SET

LOGICAL_CONDITION: ONE OR MORE CONDITIONS THAT EVALUATE TO TRUE OR FALSE. ALL VALUES FROM THE DATA_SET THAT EVALUATE TO TRUE WILL BE INCLUDED IN THE CALCULATION. THINK OF THIS LIKE A FILTER, WHERE ONLY ITEMS THAT MATCH THE LOGICAL CONDITIONS WILL BE INCLUDED IN THE LIST.

YOU CAN ADDED A LOGICAL_CONDITION TO SPECIFY HOW A RECORD IN THE DATA_SET IS MATCHED TO AN ATTRIBUTE OF THAT ROW BY ADDING A LOGICAL_CONDITION LIKE DEPARTMENT = DEPARTMENT. THE FIRST DEPARTMENT CORRESPONDS TO THE DEPARTMENT VALUE OF EACH RECORD IN THE DATA_SET; THE SECOND DEPARTMENT CORRESPONDS TO THE DEPARTMENT VALUE OF THE ROW BEING ANALYZED. THIS LOGICAL_CONDITION TELLS US TO ONLY INCLUDE OTHER ROWS THAT HAVE THE SAME DEPARTMENT VALUE.

EXAMPLES

SCENARIO: CALCULATE THE AVERAGE ANNUAL COMPENSATION IN THE EMPLOYEE'S DEPARTMENT.

AVG (SELECT(EMPLOYEE + ANNUAL_COMPENSATION + DEPARTMENT == DEPARTMENT))

RESULT: A SINGLE CURRENCY VALUE FOR EACH ROW THAT REPRESENTS THE AVERAGE ANNUAL COMPENSATION ALL EMPLOYEES WITHIN THAT PARTICULAR EMPLOYEE'S DEPARTMENT.

NOTE: THE SELECT FUNCTION RETURNS A LIST OF VALUES, WHICH IS WHY TO CALCULATE THE AVERAGE, YOU'D NEED TO INCLUDE AN AVG FUNCTION AROUND THE SELECT FUNCTION TO AGGREGATE THE LIST OF VALUES RETURNED BY SELECT.

SCENARIO: CALCULATE THE PROPORTION OF AN EMPLOYEE'S HOURS WORKED AMONG THE TOTAL HOURS WORKED IN THAT PAYROLL RUN ACROSS THE COMPANY.

(SUM (SELECT (EMPLOYEE + TOTAL_HOURS + PAYROLL_NAME == PAYROLL_NAME)))

RESULT: A PERCENTAGE VALUE FOR EACH ROW THAT REPRESENTS THAT EMPLOYEE'S PROPORTION OF TOTAL HOURS WORKED IN THAT PAYROLL RUN.

SYSTEMS, METHODS, USER INTERFACES, AND DEVELOPMENT ENVIRONMENTS FOR A DATA MANAGER

PRIORITY CLAIM

The present application is based on and claims priority to Indian Non-Provisional Patent Application No. 202211035146, having a filing date of Jun. 20, 2022, which is incorporated by reference herein.

FIELD

The disclosure generally relates to computer systems. More particularly, the disclosure relates to a data manager which enables users to create custom fields within an organizational data management platform and to manage and configure metadata about the custom fields.

BACKGROUND

A computer program is a collection of instructions that can be executed by a computer device to perform one or more tasks. Computer programs usually are written by a computer programmer (i.e., software developer, programmer, coder) having specialized knowledge of one or more highly complex computer programming languages (e.g., Java, C, C++).

A computer programmer may enter human-readable source code in a source code editor or integrated development environment (IDE). A compiler program then transforms (i.e., "compiles") the source code into a lower-level machine-readable language, such as assembly language or machine code, for execution by a computer device. Some compilers generally may compile source code into an intermediate language for execution by an interpreter computer program of a runtime environment.

Unlike computer programmers, traditional users lack the specialized knowledge, experience, and skills needed to write computer programs in a computer programming language. As such, traditional users generally are unable to develop their own custom applications and remain constrained by existing computer programs. Therefore, a need exists for providing applications, user interfaces, and application development environments that empower users with the ability to access, query, obtain, and/or perform other operations with organizational data and other types of information available in computer systems.

SUMMARY

Aspects and advantages of embodiments of the disclosure will be set forth in part in the following description, or can be learned from the description, or can be learned through practice of the embodiments.

An example aspect of the disclosure is directed to a computer-implemented method for a data manager of an organizational data management platform. The method includes generating a formula field which includes one or more dependent fields, wherein the formula field is defined and evaluated using a query expression that makes reference to an object graph data structure comprising a plurality of data objects associated with a set of organizational data stored in one or more databases. The method further includes, in response to a value of at least one of the one or more dependent fields changing to an updated value, automatically updating a value of the formula field based on the updated value of the at least one of the one or more dependent fields. The method further includes enabling inclusion of the formula field in one or more of a report, a policy, a workflow, a trigger, or a rule.

An example aspect of the disclosure is directed to a computer system that for a data manager of an organizational management platform. The computer system includes one or more processors. The computer system includes one or more databases that collectively store a set of organizational data associated with an organization, wherein the set of organizational data comprises an object graph data structure comprising a plurality of data objects associated with the set of organizational data. The computer system includes one or more non-transitory computer-readable media that collectively store instructions that, when executed by the one or more processors, cause the computer system to perform operations. The operations include generating a formula field which includes one or more dependent fields, wherein the formula field is defined and evaluated using a query expression that makes reference to the object graph data structure. The operations include, in response to a value of at least one of the one or more dependent fields changing to an updated value, automatically updating a value of the formula field based on the updated value of the at least one of the one or more dependent fields. The operations also include enabling inclusion of the formula field in one or more of a report, workflow, and trigger.

An example aspect of the disclosure is directed to one or more tangible non-transitory computer-readable media storing computer-readable instructions that, when executed by one or more processors, cause the one or more processors of a computing system to perform operations. For example, the operations may include generating a formula field which includes one or more dependent fields, wherein the formula field is defined and evaluated using a query expression that makes reference to an object graph data structure comprising a plurality of data objects associated with a set of organizational data stored in one or more databases. The operations include, in response to a value of at least one of the one or more dependent fields changing to an updated value, automatically updating a value of the formula field based on the updated value of the at least one of the one or more dependent fields. The operations also include enabling inclusion of the formula field in one or more of a report, workflow, and trigger.

Other aspects of the disclosure are directed to various systems, computer-implemented methods, apparatuses, and non-transitory computer-readable media for providing applications, user interfaces, and processing associated with generating instructions in a computer language. These and other features, aspects, and advantages of various embodiments of the disclosure will become better understood with reference to the following description and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one skilled in the art is set forth in the specification, which makes reference to the appended drawings, in which:

FIG. 6A depicts an illustration of an example application user interface with field assistance for generating instructions in a computer language, according to example embodiments of the disclosure.

FIG. 6B depicts an illustration of an example application user interface with function assistance for generating instructions in a computer language, according to example embodiments of the disclosure.

FIG. 11C depicts an illustration of an example application user interface with field assistance with browsing of available functions and associated information for generating instructions in a computer language, according to example embodiments of the disclosure.

DETAILED DESCRIPTION

Figure 1:
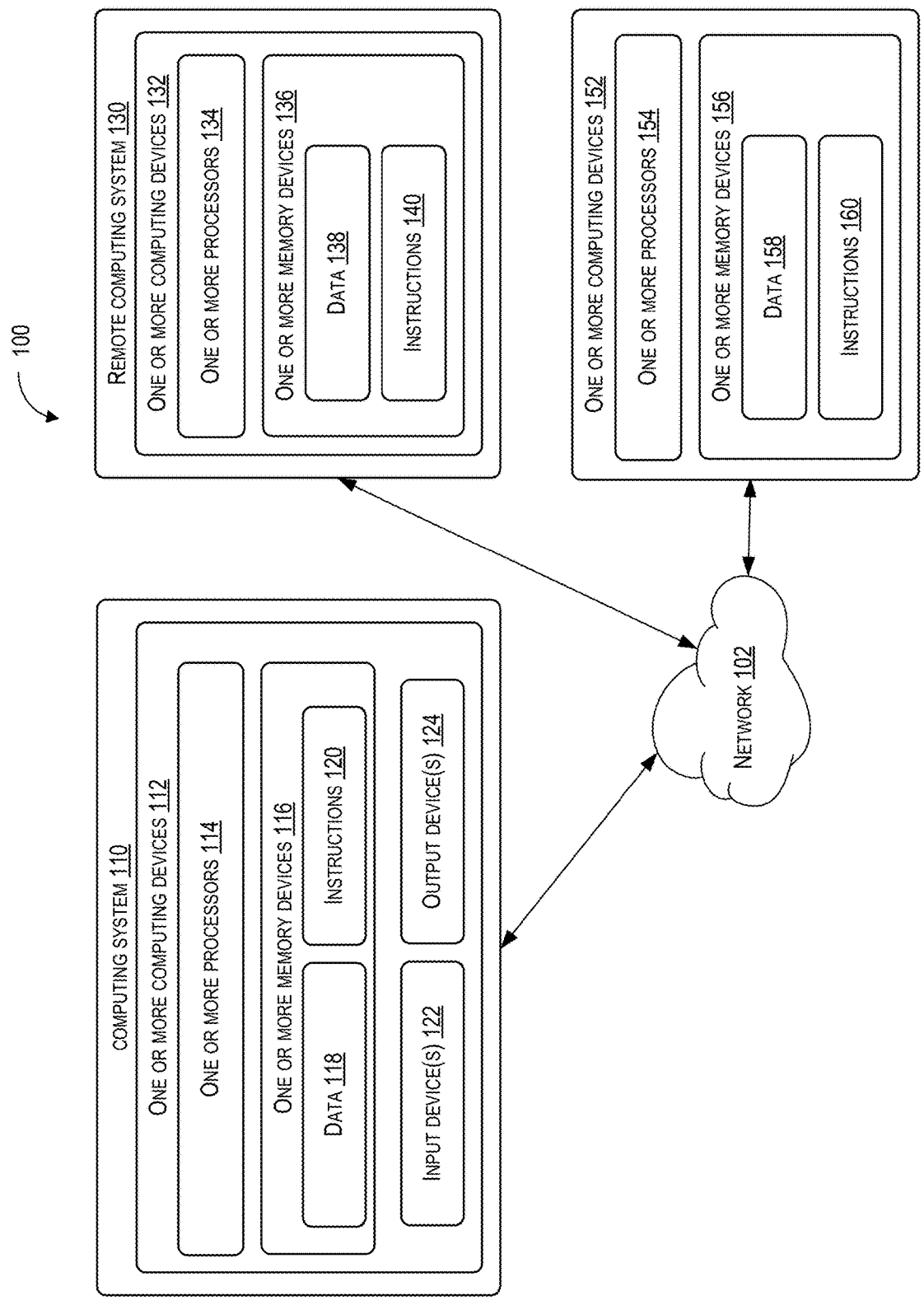
FIG. 1 depicts a block diagram of an example environment including a computing system that performs operations, according to example embodiments of the disclosure.

Reference now will be made in detail to embodiments of the disclosure, one or more examples of which are illustrated in the drawings, wherein like reference characters denote like elements. Each example is provided by way of explanation of the embodiments, not limitation of the disclosure. In fact, it will be apparent to those skilled in the art that various modifications and variations can be made to the embodiments without departing from the scope or spirit of the disclosure. For instance, features illustrated or described as part of one embodiment can be used with another embodiment to yield a further embodiment. Thus, it is intended that aspects of the disclosure cover such modifications and variations.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Generally, the disclosure is directed to improved computer systems, computer applications, user interfaces, computer-implemented methods, and/or services associated with generating instructions in a computer language. In particular, examples described in the disclosure relate to the feature of a data manager which enables users to create custom fields within an organizational data management platform and to manage and configure metadata about the custom fields. For example, an example custom field which may be created includes a formula field that utilizes a custom query language (e.g., a resource query language). In some implementations, the formula field may be automatically updated and refreshed via dependency tracking. In some implementations, the formula field may be calculated in the context of a report being generated. In other implementations, in accordance with an auto-refreshing mechanism provided via dependency tracking, the formula field may be calculated whenever a dependent field (which is implemented as part of the formula field) changes.

For example, the following custom field CF1 shown below calculates a value related to an annual salary for an employee and the total annual salaries in the department of the employee:

CF1=2*annual_salary/SUM(annual_salaries in your department)

The custom field CF1 is dependent on the value for the annual_salary field and the values for the department(fields) of all the roles in the department. That is, the annual_salaries in the department relies on annual_salaries of all the roles in the department.

For example, the following custom field CF2 shown below calculates a value related to a gross salary for an employee in the last three months:

CF2=SUM(gross salary in last 3 months for a role)

The custom field CF2 is dependent on the value for the gross_salary(field) from each of the payroll stubs issued in the last 3 months with respect to the employee object.

For example, if a user wants to be alerted if a particular value of a formula field exceeds a particular threshold, dependency tracking enables automatic recalculating, caching, storing, and refreshing of the value of the formula field whenever one or more dependent fields (implemented as part of the formula field) change.

In some implementations, the data manager enables a user to create custom fields within an organizational data management platform, for example, related to employees of the organization. In some implementations, the data manager enables a user to create custom fields within an organizational data management platform, for example, related to any object within the organizational data management platform. An object may correspond to a node of an object graph data structure that provides information about entities, relationships, rules, constraints, and/or any other aspects of managing organizational data of the organization. Example object classes may include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

As an example custom field, a user may create a formula field that is calculated for each employee's pay stub, and the formula field may automatically be re-calculated or refreshed each time a new payroll is run. The formula field may be calculated for each employee instance.

As another example, courses or surveys created by users of the organizational data management platform using a custom query language may include formula fields associated with the courses or surveys in which the formula fields can be calculated based on values or attributes from any of the entities such as objects, records, etc. which are represented by the object graph data structure. Therefore, the formula field may be calculated by traversing across different information from the object graph data structure.

For example, formula fields may be defined by a user to calculate a formula field for an employee based on the devices the employee is assigned, or formula fields may be defined by a user to calculate a formula field based on pay stubs paid during a predetermined period of time (e.g., the last six months). The data manager may traverse across different objects within the object graph data structure and may calculate the formula field for a specified base object (e.g., such as for a particular employee, a group of employees, a department, an entire organization, a physical resource such as a device or vehicle, etc.).

As yet another example, a user may define a custom field (e.g., a formula field) that calculates a total compensation of an employee. The formula field may be based on data objects represented by the object graph data structure which are associated with an annual salary of the employee, bonuses, insurance benefits, stock benefits, retirement benefits, and the like. The formula field may be associated with a report, alert, notification, group policies, etc., such that a user (e.g., the employee, a manager, HR personnel, etc.) may receive information about the total compensation of the employee. For example, the report, notification, or alert may be generated in response to the total compensation exceeding a threshold value, falling below a threshold value, or simply changing (e.g., due to a change in stock price), etc. A user may also define a custom field (e.g., a formula field) that calculates respective total compensations for a group of employees, and may define that a report be generated for all employees having a total compensation greater than a threshold value or less than a threshold value.

The custom field (e.g., formula field) may be associated with (e.g., conditioned on) dependent fields which cause the formula field to be refreshed or recalculated in response to a value of a dependent field changing. For example, the formula field may be automatically refreshed or recalculated if an employee's salary is changed, if a stock price for a stock in the employee's stock package changes, if an insurance plan is changed, and the like.

The data manager implements dependency tracking by storing a mapping of all the dependent fields which affect the value of the formula field. For example, the data manager may be configured to parse custom query language formulas during creation to obtain the mapping and store the mapping in a model in a database. The data manager may be configured to monitor the value of each of the dependent fields to determine whether to recalculate the formula field in response to one or more values of the dependent fields changing. For example, the data manager may be configured to monitor the value of one or more of the dependent fields continuously, at preset time intervals (e.g., every minute, every 30 minutes, every hour, every day, etc.), or in response to some event occurring (e.g., a change in status of the employee, a performance evaluation, dates associated with securities that are part of the employee's compensation such as a dividend payout date or a date in which an earnings report is to be released to the public, dates associated with an enrollment period for benefits, etc.). The data manager may be configured to search for formula fields which are reliant upon the dependent field which has changed using a reverse index and then recalculate each of the formula fields which are mapped to the dependent field which has changed according to the updated value of the dependent field. For example, in some implementations the data manager may be configured to recalculate the formula field by recalculating each field incorporated in the formula field or the data manager may be configured to recalculate the formula field by using previous values from each field incorporated in the formula field other than the dependent field which has changed. For example, when a formula field is to be applied to a group of employees in some implementations the data manager may be configured to recalculate the formula field for all of the employees in the group when a dependent field value changes for at least one of the employees. For example, when a formula field is to be applied to a group of employees in some implementations the data manager may be configured to recalculate the formula field for only those employees in the group in which a dependent field value associated with those employees has changed.

In some implementations, data manager may be configured to analyze whether mapping of a dependent field to a custom field (e.g., formula field) should be changed or deleted in response to the deletion of a custom field that incorporates the dependent field, in response to a custom field that incorporates the dependent field being moved or changed, or any change to a custom field that incorporates the dependent field which may affect the functionality of the dependent field or other fields which could be impacted by the change to the custom field.

In some implementations, the organizational data management platform (e.g., the data manager) may include default formula fields that calculate a value which may be a standard value that may be generally applicable to or often used in connection with employees or other resources of the organization. For example, according to some aspects of the disclosure a user may be enabled (e.g., granted permission via a permissions system) to overwrite one or more of the default formula fields (e.g., by deleting fields, adding fields, modifying fields, etc.) to create a customized default formula field.

In some implementations, a formula field may be calculated by traversing across different information from the object graph data structure according to a permissions system of the organizational data management platform. For example, when the formula field is calculated the data manager may be configured to determine or verify that the user requesting the calculation has permission to access information corresponding to various nodes or objects of the object graph data structure that are used to perform the calculation. For example, if a user defines a custom field (e.g., a formula field) that calculates a total compensation of an employee that is based on data objects represented by the object graph data structure which are associated with an annual salary of the employee, bonuses, insurance benefits, stock benefits, retirement benefits, and does not have permission to access the stock benefits data object, the data manager may take various actions. For example, the data manager may prevent the user from seeing a result of the calculation, may prevent the calculation from being performed at all, may notify the user that they do not have access to a particular data object (e.g., specifically the data object corresponding to the stock benefits), may provide a partial calculation which omits data that the user is not permitted to access, and combinations thereof. In some implementations, the user may be permitted to define the custom field and may not be permitted to view a result of the calculation while other users who have the required permissions may be able to view the result of the calculation. In some implementations, the user may not be permitted to define a custom field (e.g., formula field) which includes any fields that the user does not have permission to access the corresponding information associated with the associated data object. For example, the data manager may be configured to check or verify whether a user has permission to access information associated with a data object that is associated with a field that the user attempts to incorporate into the formula field. In some implementations, the user may not be provided or shown fields to incorporate into the custom field (e.g., formula field) where the user does not have permission to access the corresponding information associated with the associated data object.

In some implementations, users of the organizational data management platform (e.g., the data manager) may create custom fields (e.g., formula fields) based on information that is imported via the data manager from an external party (third party) and for example the object graph data structure. For example, users may import any data from another system and integrate that data into the organizational data management platform. For example, the imported data may be associated with the object graph data structure so that the formula fields can be defined by the user based on data that was previously not accessible by the organizational data management platform and particularly the data manager.

For example, a user may have retirement account with an external provider (third party) which stores data or information not accessible to the organizational data management platform. The user may wish to include the retirement account data in organizational reports, employee data, a total compensation calculation, and the like. For example, the user may import such third party data via the data manager (e.g., via a file based import, file transfer, an application programming interface, etc.) and enable the third party data to be stored in a database and/or made available to the data manager while establishing a relationship between the third party data and the data existing in the data manager (e.g., data objects associated with the object graph data structure). For example, the user may define or create custom data objects based on the third party data which may augment or be added to the object graph data structure. For example, the user may define or create custom fields (e.g., formula fields) based on the third party data alone or together with other data previously existing in the data manager (e.g., data objects associated with the object graph data structure), which may be native data for example.

In some implementations, the formula field may be implemented in a recipe or workflow which includes various elements (such as formula fields or other custom fields) that are interrelated with one another. The recipe may be part of a recipe library which include recipes for various situations (e.g., generating a task for a manager when a remote employee moves to another state, sending an alert when a device has not been returned a predetermined number of days after return packaging has been delivered to the employee, sending a notification to an employee and manager when a document has not been signed, generating and sending an alert when an urgent task is assigned to an employee on leave, sending an alert to a manager when an employee's device has been offline for a predetermined period of time, etc.). Users may modify existing recipes to integrate a created formula field or create a new recipe which integrates the created formula field.

Organizations generally use many different types of applications and computer systems to sustain operations. Such applications and computer systems generally rely on organizational data and processing tied to organizational data.

Usually, organizational data is generated, modified, and utilized separately across various different types of third-party applications and computer systems. For example, various different third-party applications and computer systems may generate and/or store portions of organizational data, may perform operations based on organizational data, may provide applications and related services to users based on organizational data, etc. However, this leaves organizations responsible for ensuring that their own organizational data is updated consistently and regularly across a variety of different applications and computer systems. In many cases, organizational data and associated processes become out of sync when not updated consistently. As such, organizations generally are left to performing continuous manual processing of organizational data, coordinating and ensuring compatibility between changing configurations across each of multiple different third-party applications and computer systems, and/or building their own expensive, proprietary integrations across various third-party applications and computer systems that must be maintained and updated regularly (e.g., when organizational procedures change, based on organizational data management changes, when vendors update their own proprietary third-party applications, etc.). As such, organizations can benefit from improved computer systems, computer applications, computer-implemented methods, user interfaces, and related services for generating instructions in a computer language for execution by a system of record that manages organizational data and associated operations performed based on the organizational data across various different third-party applications.

The disclosure describes examples for providing applications, user interfaces, and processing associated with generating instructions in a computer language. In examples of the disclosure, a computer system may provide such applications, user interfaces, and processing by maintaining one or more databases that collectively store organizational data associated with an organization where the organizational data comprises a plurality of data objects that respectively correspond to records from the organizational data, providing an application user interface for generating instructions in a custom computer language where the custom computer language includes programmatic commands for performing operations based on the organizational data, analyzing input from the application user interface where the input comprises information for generating the instructions in the custom computer language, and generating the instructions in the custom computer language based at least in part on the input from the application user interface.

Example implementations of the disclosure can be implemented in the context of or as a portion of an organizational data management platform that controls and leverages organizational data to manage organizational applications such as payroll, operations, human resources (e.g., onboarding and offboarding), benefits, information technology and device management, third-party application integration and access, and many others.

The organizational data management platform can hold, for each of one or more organizations, a centralized set of organizational data that acts as a single, centralized system of record for all organizational management processes for that organization. Each organization can include a number of users which are able to access and interact with the organizational data management platform. Some users may have administrative permissions which define whether the user is able to access and/or modify certain types of organizational data for their organization.

The organizational data for each organization can include data directly entered into the organizational data management platform and/or can include data retrieved, pulled, or otherwise obtained from one or more first party and/or third-party applications with which the organizational data management platform may have varying levels of integration. This ingestion and storage of data from third-party applications is in contrast to systems which simply sit on top of third-party applications and apply rules at run time. In some implementations, the organizational data management platform can provide a user with the ability (e.g., by configuring Simple Mail Transfer Protocol (SMTP) settings) to configure the cadence or periodicity at which the organizational data management platform receives or ingests data (e.g., via .csv files) from third-party applications. Data can be transferred between the organizational data management platform and third-party applications (e.g., to and/or from) using various techniques such as application programming interfaces, data hooks, flat files, bulk uploads/downloads and/or other data transfer mechanisms.

The organizational data can, in some implementations, be held as one or more object databases. For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices).

Example implementations of the disclosure leverage a domain-specific query language that can be used to perform (e.g., in real time) queries against the organizational data. The custom query language can be used to define functions or queries which return data that satisfies or responds to the functions or queries. In some implementations, the custom query language is a declarative language. In some implementations, the custom query language includes organization functions or operators which leverage organizational relationships within the organizational data. For example, the organization function ORG(employee, relationship) returns one or more other employees that have the specified relationship to the specified employee.

Specifically, according to an aspect of the disclosure, the custom query language can be incorporated into reports, policies, triggering, data management, and/or workflows. For example, a user-constructed query in the custom query language can be used for intelligently facilitating various downstream operations, for example, by reference/query to an employee or organizational chart.

In one example, the custom query language can allow for the creation of "calculated fields" which can be data fields which are or act as a function of a custom query language script and can be propagated to or referenced by other reports, policies, triggering, data management, and/or workflows.

In other examples, custom query language expressions can underlie or be included in predefined reports, policies, triggering, data management, and/or workflows. These predefined items can be visible and modifiable by the user (e.g., in raw query expression form or via a wizard user interface). For example, in the wizard user interface, objects or functions can be automatically populated and/or suggested.

In some implementations, the custom query language can handle or include functions or expressions which include "organization" functions or operators which leverage employee or organizational data held by the core system of record. For example, as described elsewhere herein, the function ORG(employee, relationship) can return one or more other employees that have the relationship to the employee given in the function. Other example organization functions or operators may return employees or other data based on any of the employee or organizational data held by the core system of record (e.g., return all employees working in California making over $100,000/year).

The systems, methods, applications, user interfaces, and computer program products described herein provide a number of technical effects and benefits. As one example, the embodiments described in the disclosure provide automated generation and processing of computer instructions for use across a variety of applications and systems that utilize different underlying technologies and technical designs, for example, more efficiently and with fewer computing resources (e.g., less processing power, less memory usage, less power consumption, etc.), than would otherwise be wasted by maintaining custom, proprietary, and/or manual synchronization processes. In particular, examples of the disclosure facilitate and automate the generation and processing of computer instructions using a rigorous computerized process to allow a system of record to perform operations involving organizational data and also to perform various operations across different applications and systems based on the organizational data.

With reference to the Figures, example embodiments of the disclosure will be discussed in further detail.

FIG. 1 depicts a block diagram of an example environment 100 including a computing system 110 that performs operations according to example embodiments of the disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that, individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated with providing applications, user interfaces, and processing associated with generating instructions in a computer language (e.g., a custom computer language designed for use with organizational data) across various types of applications and/or computer systems. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include maintaining one or more databases that collectively store organizational data associated with an organization where the organizational data comprises a plurality of data objects that respectively correspond to records from the organizational data, providing an application user interface for generating instructions in a custom computer language where the custom computer language includes programmatic commands for performing operations based on the organizational data, analyzing input from the application user interface where the input comprises information for generating the instructions in the custom computer language, and generating the instructions in the custom computer language based at least in part on the input from the application user interface, etc.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or more policies associated with the organizational data, the rule data, the application data, one or more applications, one or more devices, etc.), data that includes instructions in a custom computer language (e.g., a custom query language based on organizational data), data that includes rules associated with the custom computer language, and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications, which can include one or more third-party applications that may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing applications, user interfaces, and processing associated with generating instructions in a computer language, for example, based at least in part on user input received via one or more graphical user interfaces.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, application object data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), application object data, and/or other types of data.

Figure 2:
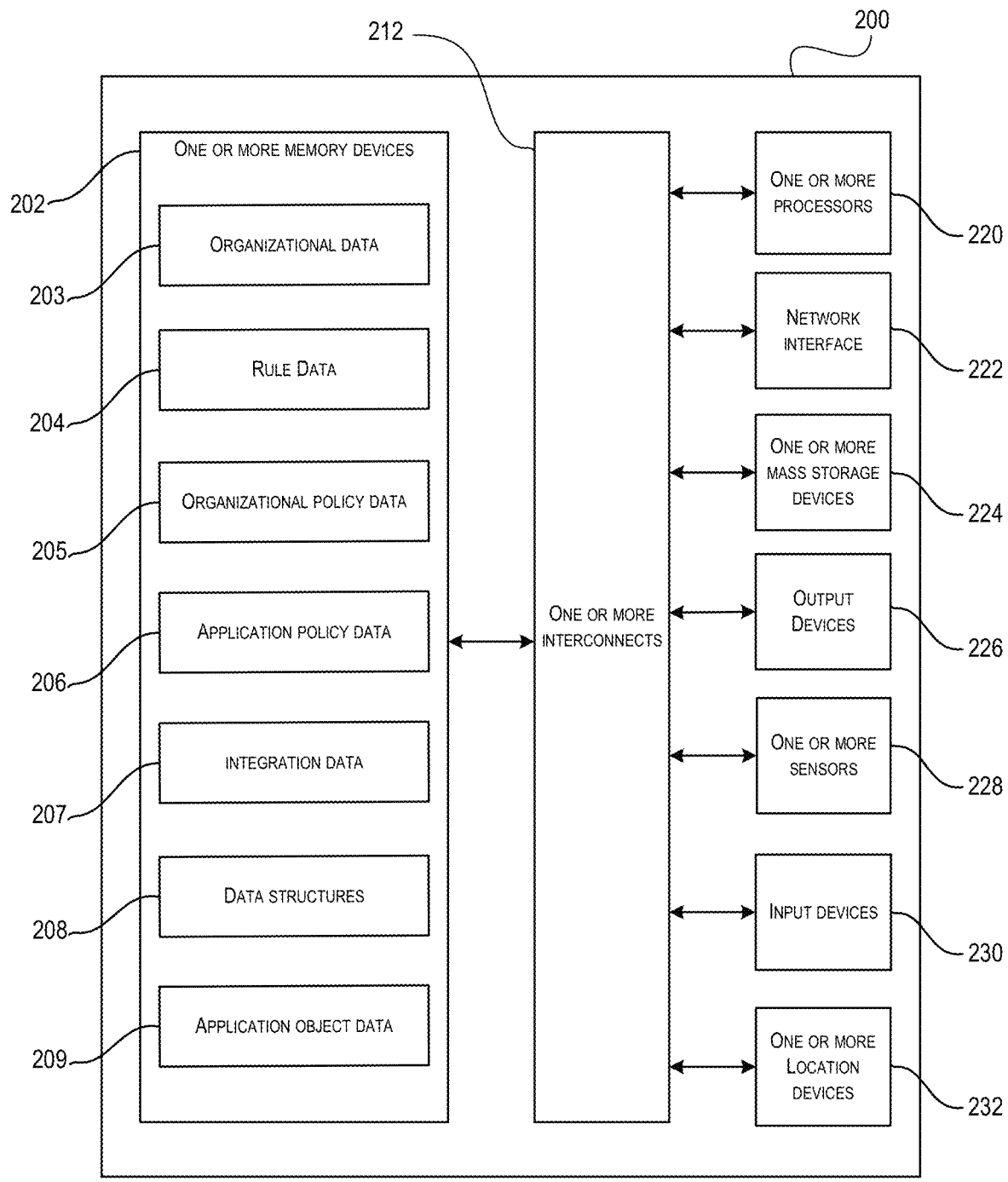
FIG. 2 depicts a block diagram of an example of a computing device, according to example embodiments of the disclosure.

FIG. 2 depicts a block diagram of an example computing device 200 according to example embodiments of the disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, application policy data 206, integration data 207, data structures 208, application object data 209, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, application policy data 206, integration data 207, data structures 208, application object data 209, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with providing applications, user interfaces, and processing associated with generating instructions in a computer language (e.g., computer instructions in a custom computer language that includes programmatic commands for performing operations based on organizational data). For example, such operations may include, but are not limited to, maintaining one or more databases that collectively store organizational data associated with an organization where the organizational data comprises a plurality of data objects that respectively correspond to records from the organizational data, providing an application user interface for generating instructions in a custom computer language where the custom computer language includes programmatic commands for performing operations based on the organizational data, analyzing input from the application user interface where the input comprises information for generating the instructions in the custom computer language, and generating the instructions in the custom computer language based at least in part on the input from the application user interface.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1), which can include one or more computing systems that are remote from the computing device 200 (e.g., in another room, building, part of town, city, or nation).

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy. The rule data 204 also can include information associated with one or more rules of an organizational data management system (e.g., base or default rules provided or enforced by the system, one or more custom rules configured by an organization, etc.). The rule data 204 also can include one or more rules associated with implementing and/or utilizing a custom computer language, such as a custom computer language for performing operations associated with organizational data 203. In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 205 can be received from one or more computing systems (e.g., the remote computing system 130 depicted in FIG. 1), which can include one or more computing systems that are remote from the computing device 200.

The application policy data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application policy data 206 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 206 can be received from one or more computing systems (e.g., the remote computing system 130 depicted in FIG. 1), which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for maintaining organizational data and for performing corresponding processing), for example, to obtain information from one or more applications (e.g., third party and/or other applications), to perform operations involving organizational data (e.g., organizational data 203) in the organizational data management system, to synchronize organizational data across one or more applications, to perform or cause one or more actions involving the applications based on organizational data in the organizational data management system, and/or to perform or cause one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, and/or any other types of entities representing or related to managing organizational data 203.

The data structures 208 also can define various relationships among the various entities associated with organizational data 203. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 203 with one or more associated organizational data management applications).

In some embodiments, the data structures 208 can include one or more object graphs providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities (e.g., data objects), entity attributes, entity attribute categories, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

The application object data 209 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application object data 209 generally can include any information used to implement any particular type of application object or associated data structure that stores, references, utilizes, and/or processes data (e.g., organizational data 203). For example, such types of application objects generally may include, but are not limited to, application triggers, reports, workflows, tasks, custom application objects (e.g., custom user-defined objects, custom organization-defined objects, etc.), and/or any other types of objects used to store and/or process data in a system of record, such as an organizational data management system. Further, application object data 209 used to implement any particular type of application object or associated data structure may include, but is not limited to, instructions in a computer language (e.g., a custom computer language provided by an organizational data management system provider for managing organizational data 203), metadata associated with application objects or related data structures, data associated with one or more particular instances of application objects or related data structures, data associated with configuration of one or more application objects or related data structures, etc. In some embodiments, the application object data 209 can be received from one or more computing systems (e.g., the remote computing system 130 depicted in FIG. 1), which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, organizational policy data 205, application policy data 206, integration data 207, data structures 208, application object data 209, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (e.g., FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the organizational policy data 205, the application policy data 206, the integration data 207, the data structures 208, the application object data 209, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the organizational policy data 205, the application policy data 206, the integration data 207, the data structures 208, the application object data 209, and/or any other data. The one or more output devices 226 can include one or more display devices (e.g., liquid crystal display (LCD), OLED display, mini-LED display, micro-LED display, and/or plasma display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
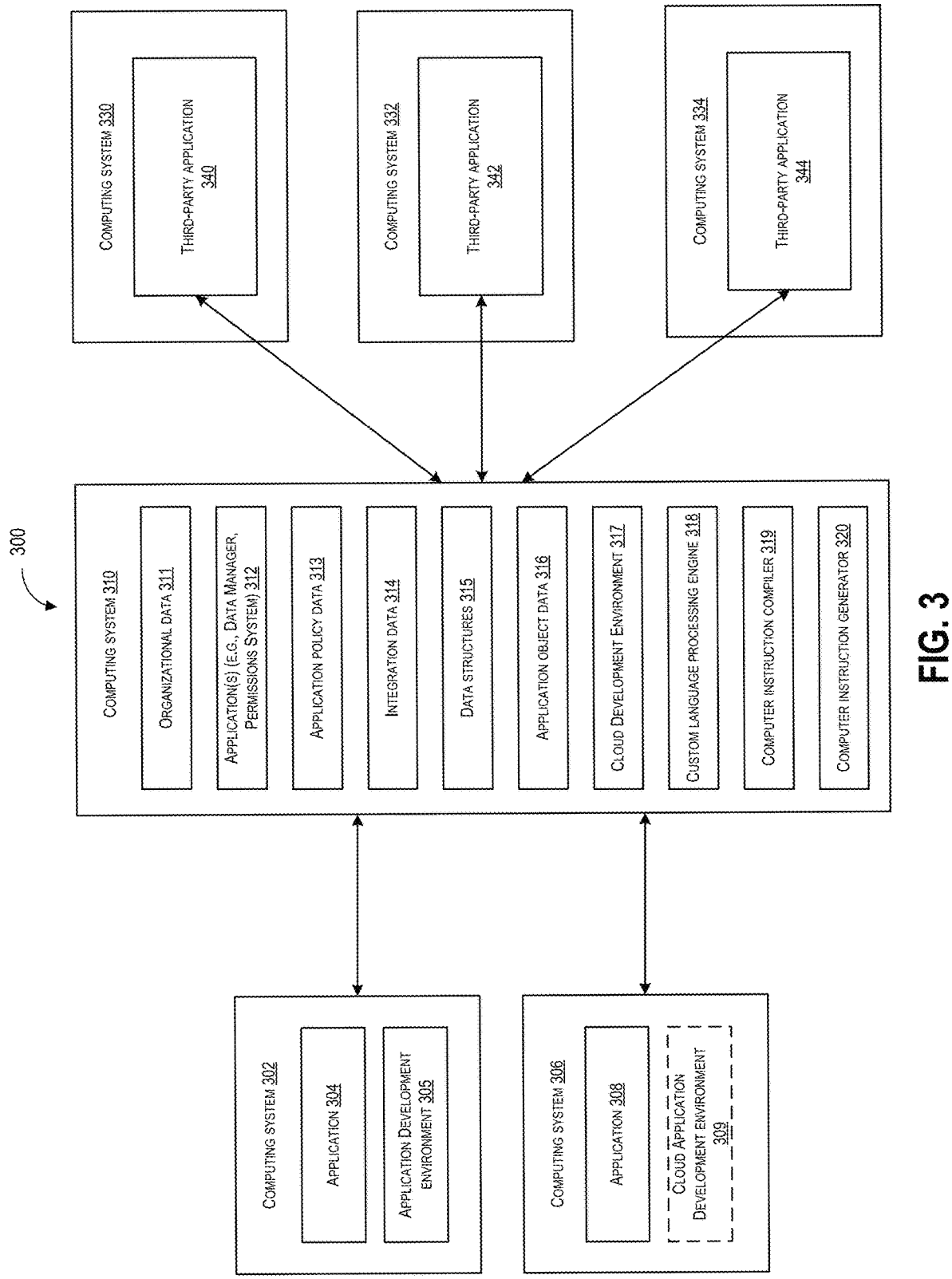
FIG. 3 depicts a block diagram of an example computing environment including multiple computing systems, according to example embodiments of the disclosure.

FIG. 3 depicts a block diagram of an example computing environment 300 including multiple computing systems, according to example embodiments of the disclosure. Any of computing system 302, computing system 306, computing system 310, computing system 330, computing system 332, or computing system 334 can include one or more attributes and/or capabilities of the computing system 110, the remote computing system 130, the one or more computing devices 152, and/or the computing device 200. Furthermore, any of the computing system 302, the computing system 306, the computing system 310, the computing system 330, the computing system 332, or the computing system 334 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, an application development environment 305, the computing system 306, an application 308, a cloud application development environment 309, the computing system 310, organizational data 311 (e.g., organizational data 203), one or more application(s) 312, application policy data 313, integration data 314, data structures 315, application object data 316, cloud development environment 317, custom language processing engine 318, computer instruction compiler 319, computer instruction generator 320, one or more computing systems 330, 332, 334, and third-party applications 340, 342, 344.

In an embodiment, the computing system 302, the computing system 306, the computing system 310, the computing system 330, the computing system 332, and/or the computing system(s) 334 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, one or more application(s) 312 provide access to, utilize, support, and/or otherwise provide various interfaces or services that enable other applications (e.g., application 304, application development environment 305, application 308, cloud application development environment 309, application(s) 312) and/or users to perform various operations and activities involving one or more custom computer languages. For example, a custom computer language (e.g., a custom query language) generally may provide users with a simplified set of computer instructions that align with or match a user's understanding of a functional or business environment, such as an organization, business, industry, sector, etc. In some embodiments, each of one or more custom computer languages is a user language that allows users with a basic understanding of a subject, topic, business area, organization, functional role, industry, sector, etc. to implement custom computer instructions in terms that are familiar to the users, without knowledge of a complex computer programming language, without dependence on computer programmers, without being aware of or needing to know the complexity of underlying data organization and storage, without needing to understand, implement, and/or maintain a complex web of join conditions across various sets of underlying data, etc.

In an embodiment, a custom computer language generally enables users of any skill or level with a basic knowledge of a subject area to perform one or more operations or activities associated with an application (e.g., any of applications 312). For example, a custom computer language generally may enable a user to create, update, execute, and/or otherwise implement custom queries, reports, policies, workflows, triggers, and/or any other functionality and operations associated with an application. In some embodiments, a custom computer language enables a user to utilize and perform various operations involving organizational data 311. For example, one or more applications associated with an organizational data management system or any other types of applications (e.g., applications 312) generally may provide a custom computer language allowing users to perform operations based on the structure and/or relationships associated with organizational data 311 (e.g., with or without specifying data joins specifying relationships between various objects).

In an embodiment, a custom computer language may allow a user to use simplified terms to query organizational data 311. In one example, a custom computer language may allow a user to obtain the name of an employee's manager with the following example query: "ORG(John Smith, Manager)", which may return "Jane Jones" as the manager of the employee. As such, a custom computer language for an application may allow a user to use simplified and familiar terms without needing to understand complex interrelationships between various types of data stored across one or more different databases and/or other types of data stores. Further, a custom computer language generally may be processed by one or more applications (e.g., application(s) 312 associated with an organizational data store) so that users do not have to specify data joins when performing various operations involving organizational data 311.

In an embodiment, a custom computer language (e.g., a custom query language) includes a function that reports quantile information based on employee information or any other type of organizational data. For example, such a function generally may be labeled as a "quantile" function, as a "percentile" function, or given any other type of label or name. The following examples generally refer to the function name as "quantile" for illustration purposes only.

In an example, a "quantile" function of a custom query language generally may return a particular quantile (e.g., decile, percentile, etc.) of organizational data (e.g., an employee, a department, etc.) in comparison to other corresponding organizational data (e.g., other employees, other departments, etc.). In one example, a "quantile" function call in a custom query language may take four arguments. For example, a first example argument of the "quantile" function may specify a particular instance of organizational data 311 such as a particular employee, a particular department, a particular contractor, a particular vendor, or any other particular instance of organizational data 311. A second example argument of the "quantile" function may specify a numeric attribute value, a derived value, or a calculated value for comparison. A third example argument of the "quantile" function may specify a logical condition that evaluates to "true" or "false" for corresponding organizational data (e.g., other employees, other departments, etc.) where the corresponding organizational data that evaluates to "true" is included when calculating quantile information. As such, corresponding organizational data that evaluates to "false" would not be included when calculating quantile information. A fourth example argument of the "quantile" function may specify a particular quantile to use for analysis. For example, the example fourth argument may specify a numeric value representing a number of buckets to use for calculating a particular quantile (e.g., the value "4" for quartiles, the value "5" for quintiles, the value "10" for deciles, the value "100" for percentiles and/or any other value for calculating a particular, specialized quantile associated with organizational data 311). The example fourth argument also could take text input indicating a particular type of quantile to utilize (e.g., "quartile", "quintile", "decile", "percentile", etc.) and is not limited to numeric values.

In one example, a signature of an example "quantile" function of a custom computer language (e.g., a custom query language) generally can be defined and/or appear as "QUANTILE({employee_information}, {attribute_value_to_compare}, {logical_condition, quantile_type})". For example, an example call to the "quantile" function of the custom query language generally may be invoked based on the following example custom query language statement: "QUANTILE("Denise Smith", compensation, level=$level, 10). In the example quantile function call, the first example argument specifies the name of a particular employee or individual. Other values, such as a unique employee identifier, unique contractor identifier, and/or any other type of unique identifier of a particular instance of organizational data may be utilized (e.g., unique department name, unique department id, etc.).

The second example argument in the example quantile function call indicates compensation as the attribute of the specified employee (i.e., "Denise Smith") to be compared. Also, any derived or calculated values, such as "TODAY( )–employee_start_date" (e.g., which calculates an employee's length of employment) may be utilized. The third example argument in the example quantile function call indicates a logical condition where the level of other employees "level" is equal "=" to the level of "Denise Smith" "$level". As such, employees at the same level as "Denise Smith" in an organizational data management system as indicated by the organizational data will be included in the QUANTILE determination of the current example. The fourth example argument in the example quantile function call "10" indicates that 10 quantiles (i.e., "deciles") are to be used in the calculation of determining how "Denise Smith's" "compensation" compares to other employees at the same level (i.e., "level=$level"). Thus, "Denise Smith" may fall into any one of 10 buckets depending on how her "compensation" compares to other employees in an organization based on organizational data 311.

The example QUANTILE function generally can return the number of the particular, specified quantile (e.g., the bucket number) based on a determination. Continuing with the current example, if "Denise Smith" had "compensation" that ranked in the top ten percent of employees at the same level (i.e., "level=$level") then "10" would be returned as the determined decile bucket of the example quantile function (or, for example if quartiles were specified instead of deciles, then "4" would be returned). Similarly, if the "compensation" of "Denise Smith" ranked last in the determination, then a "1" would be returned as the determined decile bucket of the example quantile function ("1" also would be returned if quartiles were specified instead of quintiles). In an additional example, a custom query language statement: "QUANTILE("Denise Smith", equity_grant, start_date<$start_date+90 and start_date>$start_date−90 and equity_grant>0, 100) returns "Denise Smith's" "equity grant" decile in comparison to other employees with start dates within 90 days of "Denise Smith's" start date where those employees have equity grants.

In an embodiment, a custom computer language is based on and/or otherwise associated with one or more data structures 315 associated with an application. For example, a custom computer language may be based on, represent, describe, or otherwise be associated with an object graph data structure 315 (e.g., a master object graph, any one or more portions of a master object graph, etc.) and/or any other types of data structures 315 that describe the structure of an application and/or the underlying data associated with an application. In an example, a custom computer language is based on the structure of one or more applications and/or associated organizational data 311 of an organizational data management system. For example, the structure of the one or more applications and/or the associated organizational data 311 may be represented and described in one or more data structures 315 including, but not limited to, one or more independent and/or interrelated object graph data structures 315. In various embodiments, an application (e.g., one of application 312) and/or another supporting application used in association with the application can utilize object graph data structures 315 to process and perform various underlying operations associated with custom computer language instructions.

In an embodiment, the computing system 302 includes an application development environment 305 that provides users with access to and/or operations associated with one or more computer languages including, but not limited to, a custom computer language. For example, the application development environment 305 can be associated with one or more applications of an organizational data management system that stores and manages various types of organizational data 311. In an example, application development environment 305 generally may be an application (e.g., application 304) or portion of an application that enables a user to perform various operations involving organizational data 311 of an organizational data management system using a custom computer language. For example, application development environment 305 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the application development environment 305 may run, for example, on a computing system (e.g., computing system 302) and/or in association with information, applications, and/or services on another computing system (e.g., computing system 310). For example, application development environment 305 may utilize organizational data 311, application(s) 312, application policy data 313, integration data 314, data structures 315, and/or application object data 316 available from another computing system (e.g., computing system 310, one or more computing systems associated with an organizational data management system, etc.). Application development environment 305 also may include a query processing engine (not shown), computer instruction compiler (not shown), computer instruction generator (not shown), and/or other specialized computer software for performing one or more operations associated with providing applications, user interfaces, and processing associated with generating instructions in a computer language (e.g., a custom computer language provided by an organizational data management system or any other type of system of record). Application development environment 305 also may utilize or work in conjunction with, in whole or in part, with any one or more of cloud development environment 317, custom language processing engine 318, computer instruction compiler 319, computer instruction generator 320, and/or other operations or features available from another computing system (e.g., computing system 310, one or more computing systems associated with an organizational data management system, etc.).

In an embodiment, application development environment 305 can include an editor that allows users to enter, define, edit, check, store, schedule, execute, and/or perform any other operations associated with creating, viewing, maintaining, and/or utilizing computer instructions in a custom computer language. In some embodiments, application development environment 305 includes a textual editor that enables users to enter and manipulate computing instructions in a custom computer language. In some examples, a textual editor of the application development environment 305 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the application development environment 305 may be based on and may actively utilize one or more data structures 315 (e.g., an object graph based on organizational data 311) associated with implementation of a custom computer language.

In an embodiment, application development environment 305 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via drag and drop and/or any other types of graphical user interfaces (e.g., which may include a software wizard or setup assistant user interface that presents a user with a sequence of dialog boxes or other types of interfaces that guide the user through a series of operations in generating one or more statements in a custom computer language). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the application development environment 305 may provide a textual editor in combination with the visual editor to allow users to view, utilize, and alternate between both textual and visual editors of a custom query language, for example, as part of the same user interface. In some examples, application development environment 305 can parse and perform various operations involving instructions in a custom computer language alone or in association with another computing system (e.g., based on various data and/or services provided by computing system 310).

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect when an employee receives a promotion or a raise, changes to a different department, is added to one or more new teams, is assigned new computer hardware or other equipment, etc.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308. In some examples described herein, the application(s) 312 can, for example, include a data manager application which will be described in more detail herein. One or more aspects of the data manager application may be implemented together with application(s) 304, application(s) 308, or third-party applications(s) 340, 342, 344.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

In an embodiment, the computing system 306 includes a cloud application development environment 309. For example, the cloud application development environment 309 generally may be a local instance of an online integrated development environment (e.g., a cloud development environment 317) provided by one computing system (e.g., computing system 310) that is accessed from a web browser and/or any other type of application 308 on another computing system (e.g., computing system 306). For example, the cloud application development environment 309 can be associated with one or more applications of an organizational data management system that stores and manages various types of organizational data 311. In an example, cloud application development environment 309 generally may be an application (e.g., application 308) or portion of an application that enables a user to perform various operations involving organizational data 311 of an organizational data management system using a custom computer language. For example, cloud application development environment 309 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the cloud application development environment 309 may run, for example, on a computing system (e.g., computing system 306) and/or in association with information, applications, and/or services on another computing system (e.g., computing system 310). For example, cloud application development environment 309 may utilize one or more of organizational data 311, application(s) 312, application policy data 313, integration data 314, data structures 315 and/or application object data 316 available from another computing system (e.g., computing system 310, one or more computing systems associated with an organizational data management system, etc.). Cloud application development environment 309 also may include a query processing engine (not shown), computer instruction compiler (not shown), computer instruction generator (not shown), and/or other specialized computer software for performing one or more operations associated with providing applications, user interfaces, and processing associated with generating instructions in a computer language. Cloud application development environment 309 also may utilize or work in conjunction with, in whole or in part, any one or more of cloud development environment 317, custom language processing engine 318, computer instruction compiler 319, computer instruction generator 320 and/or other operations or features available from another computing system (e.g., computing system 310, one or more computing systems associated with an organizational data management system, etc.).

In an embodiment, cloud application development environment 309 can include an editor that allows users to enter, define, edit, check, store, schedule, execute, and/or perform any other operations associated with creating, viewing, maintaining, and/or utilizing computer instructions in a custom computer language. In some embodiments, cloud application development environment 309 includes a textual editor that enables users to enter and manipulate computing instructions in a custom computer language. In some examples, a textual editor of the cloud application development environment 309 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the cloud application development environment 309 may be based on and may actively utilize one or more data structures 315 (e.g., an object graph based on organizational data 311) associated with implementation of a custom computer language.

In an embodiment, cloud application development environment 309 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via a drag and drop and/or any other types of graphical user interfaces (e.g., which may include, for example, a software wizard or setup assistant user interface that presents a user with a sequence of dialog boxes or other types of interfaces that guide the user through a series of operations in generating one or more statements in a custom computer language). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the cloud application development environment 309 may provide a textual editor in combination with the visual editor to allow users to view, utilize, and alternate or toggle between both textual and visual editors of a custom query language, for example, as part of the same user interface.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls, or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, and/or platform.

The application policy data 313 can include one or more rules that determine how one or more applications, such as one or more third-party applications or organizational applications are accessed, modified, and/or controlled. For example, the application policy data 313 can use the organizational data 311 that is associated with the application 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311, applications provided with or as part of an organizational data management system used by the organization as a system of record for maintaining the organizational data 311, etc.), and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organizational data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, application 308, etc.) that use or perform operations based on the organizational data 311). Such integration data 314 may include, but is not limited to, information indicating and/or describing various data that enables performance of an integration between applications or systems, such as an integration type information (e.g., flat file, application programming interface or "API", webhook, system call, etc.), security information (authentication information, encryption information, etc.) technical information (e.g., file locations, call information, system naming, application naming, IP address information, port information, etc.), integration flow information (e.g., push, pull, bidirectional, etc.), integration activation (e.g., scheduling or timing information, event information, one or more rules, one or more triggers, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems, generating and processing computer instructions across one or more different systems based on the organizational data 311, etc. In an embodiment, the data structures 315 generally can include information about the properties or attributes of each of one or more entities associated with the organizational data 311. Data structures 315 also can include information describing relationships associated with one or more entities associated with the organizational data 311 (e.g., explicit relationships defined between entities, virtual relationships determined based on various attributes and data associated with entities, etc.). In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating computer instructions, processing computer instructions, generating workflows, executing workflows, generating triggers, evaluating trigger conditions, performing trigger operations, creating reports, running reports, etc.

In an embodiment, the data structures 315 can include one or more object graphs and/or any other types of logical or physical structures that provide information about entities, relationships, rules, constraints, and/or any other aspects of managing the organizational data 311. For example, such object graphs can include one or more nodes representing entities associated with the organizational data 311 and one or more edges that connect and represent relationships between the nodes (e.g., explicit edges defining relationships between entities and data of such entities, virtual edges inferring relationships between entities and data of such entities, etc.). The data structures 315 can also include organizational data and/or associated metadata. In addition, the data structures 315, together or alone, generally may represent one or more structural aspects of an application or system (e.g., such as an organizational data management system that is a system of record for organizational data 311 of an organization). In various examples, the data structures 315 generally may be used to support one or more of various operations associated with providing application, user interfaces, and processing associated with generating instructions in a computer language. For example, the data structures 315 alone or in combination with configuration data and/or one or more types of other information) may be used to generate new instructions in a computer language, which may include a custom computer language based on high-level structure of organizational data. Further, such new instructions generally may include one or more operations (e.g., one or more underlying data joins) that are identified and included in the generated instructions based on analyzing instructions received in the custom computer language in view of the data structures 315.

The computing system 310 includes the application object data 316, which can be implemented on the computing system 310. For example, the application object data 316 can include any information that is used to implement any type of application object or data structure for an application object that may store, reference, utilize, and/or process data. In an example, a system of record generally may support application objects that include, but are not limited to, application triggers, application reports, application workflows, application tasks, custom objects, and/or any other types of objects used in an application.

In an embodiment, application triggers generally may include application objects that are referenced based on an event. For example, an application trigger may be referenced based on one or more internal application or system events (e.g., occurring within a system of record, etc.), based on one or more external application or system events (e.g., occurring outside of a system of record, occurring in a third-party application integrated with a system of record, etc.), or based on a combination of one or more internal application or system events and one or more external application or system events.

Generally, an application trigger may include one or more conditions to be evaluated when the application trigger is referenced by an application or system. For example, such conditions may include, but are not limited to, conditional statements that test one or more aspects of organizational data 311. In one example, when the application trigger is referenced and the conditions of the application trigger are satisfied (e.g., evaluate to true), then one or more operations associated with the trigger are automatically executed. For example, the one or more operations associated with the application trigger may cause an application or system to perform one or more operations internally, may cause the application or system to perform one or more operations in association with an external application or system (e.g., based on an integration, etc.), or may cause the application or system to perform one or more operations internally and to perform one or more operations with an external application or system.

In an embodiment, application reports generally may include any computer instructions that are executed by an application or system to obtain a collection of data or the resulting collection of data. Application workflows generally may refer to an object or objects that define a sequence of operations for automating a process associated with an application or system. Application tasks generally may be objects that are used to define one or more actions or pieces of work to be performed by a user or group of users. Application tasks may be assigned or delegated to one or more users or groups of users. Application tasks also may include information related to a particular task (e.g., start date, due date, etc.). Applications and systems may allow a user of an organization to create custom objects, which may define one or more custom object attributes, custom object operations, and relationships with entities provided by an application or system and/or other custom objects defined for an organization.

The computing system 310 includes the cloud development environment 317, which can be implemented on the computing system 310, for example, to provide users with access to an environment for writing, building, testing, executing, and/or performing any other types of operations involving instructions in a custom computer language. In an embodiment, the cloud development environment 317 may include and/or perform operations associated with any one or more of the custom language processing engine 318, computer instruction compiler 319, and/or computer instruction generator 320. In addition, the cloud development environment 317 may run on one computing system (e.g., computing system 310) and provide one or more services to applications running on another computing system (e.g., application development environment 305 on computing system 302, cloud application development environment 309 on computing system 306, etc.). Further, the cloud development environment 317 may perform any one or more of the operations previously described with respect to application development environment 305 and/or cloud application development environment 309. Similarly, application development environment 305 and/or cloud application development environment 309 may perform any one or more of the operations described in association with cloud development environment 317.

The computing system 310 includes the custom language processing engine 318, which can be implemented on the computing system 310 and used to perform operations associated with processing requests based on instructions in a custom computer language. In various embodiments, the custom language processing engine 318 may receive requests for processing that include one or more instructions in a custom computer language. For example, such requests may be received from one or more different computing systems (e.g., computing system 302, computing system 306, computing system 310, etc.) and/or one or more different applications (e.g., application 304, application development environment 305, application 308, cloud application development environment 309, application(s) 312, cloud development environment 317, etc.). Custom language processing engine 318 may be associated with or utilize any one or more of computer instruction compiler 319 and/or computer instruction generator 320, which for example, may be separate, part of, or integrated with the custom language processing engine 318.

In an embodiment, a computer instruction compiler 319 of the custom language processing engine 318, can be implemented on the computing system 310 and used to perform operations associated with analyzing instructions in a custom computer language including, but not limited to, parsing and analyzing custom computer language instructions based on one or more rules associated with a custom computer language and/or associated data structures 315, for example, to determine whether any error exists in the custom computer language instructions, to identify one or more errors in the custom computer language instructions, to return information about one or more of the identified errors, to determine when the custom computer language instructions are free from error, etc. The computer instruction compiler 319 of the custom language processing engine 318 may include or be associated with a computer instruction generator 320 that generates one or more new instructions in a computer language, such as a custom computer language.

In an embodiment, a computer instruction generator 320 of a custom language processing engine 318, can be implemented on the computing system 310 and used to perform operations associated with generating one or more new instructions in a custom computer language. For example, the computer instruction generator 320 may generate instructions in a custom computer language for execution based on configuration of one or more application objects and/or data associated with such application objects (e.g., application triggers, application reports, application workflows, application tasks, custom objects, etc.). In one example, such instructions in the custom computer language may be executed by an application of a system of record to perform one or more operations involving the system of record and/or any third-party application that has been integrated with the system of record.

In an embodiment, the computer instruction generator 320 may generate instructions in any computer language, for example, to be executed in association with any application or computing system. For example, the computer instruction generator 320 may generate instructions in a different computer language for execution with one or more other applications 312 or data stores (not shown) on or associated with computing system 310 and/or one or more other applications (e.g., application 304, application 308, third-party application 340, third-party application 342, third-party application 344) associated with other computing systems (e.g., computing system 330, computing system 332, computing system 334), based on analyzing instructions in the custom computer language in combination with other information (e.g., information associated with one or more data structures 315 describing the structure of an application associated with an organizational data management system that manages organizational data 311).

In an embodiment, one or more data stores (not shown) may run individually or in any combination with one or more different computing systems (e.g., computing system 310, computing system 330, computing system 332, computing system, 334, and/or any other computing system). Each data store generally may include one or more collections of data, such as organizational data 311 and/or other data that is associated with and/or accessible from application(s) 312 and/or other applications running on corresponding computing system(s) 320. In one example, each data store may be associated with a particular database application or any other type of data storage software applications that store and provide access to organizational data 311. In some examples, each data store may provide access to organizational data 311 via the same computer language (e.g., a standard computer language for data access). In some examples, any one or more of the data stores each may use different computer languages to provide access to organizational data 311 (e.g., one or more standard computer languages, one or more proprietary computer languages, and/or specialized data access languages).

In an embodiment, custom language processing engine 317 uses new instructions generated from one or more statements or instructions based on a custom computer language to query one or more data stores (not shown). In various examples, custom language processing engine 317 then may process, combine, and/or generally perform any other types of operations on information (e.g., organizational data 311) obtained from the one or more data stores. In addition, the custom language processing engine 317 then may return the results obtained from the one or more data stores in response to a request based on one or more statements or instructions based on a custom computer language.

In various examples, third-party applications (e.g., third-party application 330, third-party application 332, third-party application 334) generally may be any type of computer application (e.g., associated with or of the same type of any application referenced within the disclosure or otherwise available for use). In some examples, each third-party application may be associated with a respective computing system (e.g., computing system 330, computing system 332, or computing system 334). In some examples, each third-party application may be associated with any one or more different computing systems. In some examples, multiple third-party applications may run on each of one or more computing systems.

In an embodiment, an application store computing system (not shown) provides an organization with access to multiple different integration applications (not shown) for integrating organizational data 311 and/or associated processes with and across various different applications and/or systems (e.g., application(s) 312, third-party application 340, third-party application 342, third-party application 344, etc.). An application store computing system also may provide an organization with one or more other types of applications, including but not limited to, platform utility apps that provide additional functionality to an organizational data management application or system, other apps that may include integration-related applications, and/or any other types of applications. Generally, the application store computing system may provide one or more various applications for a flat fee, based on a subscription purchase, usage, a number of users, a number of computing systems, a number of processors, and/or any other criteria, as part of a limited trial, for free, and/or generally under any type of arrangement. In an embodiment the application store computing system is managed and provided by the same party that provides an organizational data management system to organizations. For example, the integration applications provided by the application store computing system generally may be specialized for use with the organizational data management system (e.g., and not end-user versions of applications that would be installed for general purpose use by end-users on end-user devices or for use by end-users via cloud services or any other types of services).

In an embodiment, the integration applications generally can be any application that allows an organization to manage any one or more aspects associated with providing one or more corresponding end-user applications to individual members (e.g., employees), teams, roles, departments, and/or any other grouping or categorization of individuals in an organization. For example, each of the integration applications can be used by an organization to control and automate various tasks associated with provisioning, configuring, maintaining, and integrating third-party applications. In some embodiments, one or more of the integration applications can allow an organization to configure automated assignment of a corresponding end-user application to one or more individuals, user account creation, single sign-on setup, provisioning, installation, setup, and/or maintenance of corresponding end-user applications (e.g., third-party applications or other applications available for use by end users) provided to particular individuals, groups, and/or one or more devices associated with such individuals or groups in the organization (e.g., via installation on respective user devices, via a cloud application service available to end users, etc.).

In an embodiment, one or more of the integration applications can provide integration of organizational data 311 and associated services with one or more corresponding third-party applications (e.g., application 304 on computing system 302, application 308 on computing system 306, application(s) 312 on computing system 310, third-party application 340 on computing system 330, third-party application 342 on computing system 332, third-party application 344 on computing system 334, etc.) that utilize and/or perform operations based on organizational data 311. For example, each of the integration applications can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications and/or other applications provided by the application store computing system may include, but are not limited to, collaboration apps, support apps, design apps, development apps, finance and legal apps, human resources (HR) and benefits apps, information technology (IT), device management, and security apps, office management apps, sales and marketing apps, charitable apps, platform utility apps, and/or other types of apps. Generally, various different types of applications provided by the application computing system may be organized, categorized, grouped, presented, and/or otherwise offered in any type of arrangement, and thus are not limited to any particular examples discussed herein, which are provided for illustration purposes only.

In an embodiment, collaboration apps may include, for example, any applications that provide scheduling, communications, document sharing and management, electronic signature services, project management, productivity, and/or any other types of applications that facilitate work between individuals, groups, and/or parties.

In an embodiment, support apps may include, for example, any applications that provide services associated with customer support, technical support, issue reporting, issue management and escalation, tracking and managing help desk tickets, and/or any other types of applications that facilitate customer, business, and/or technology support.

In an embodiment, design apps may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications or systems used to manage various aspects of an organization.

In an embodiment, human resources (HR) and benefits apps may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps may include, for example, any applications that provide services associated with device management, technology, information security, password management, and/or any activities associated with managing applications, systems, devices, or associated technology.

In an embodiment, office management apps may include, for example, any applications that provide services associated with facilities management, receptionist services, physical access, visitor access, catering services, office layout, office assignments, and or any other types of applications or systems associated with performing office management.

In an embodiment, sales and marketing apps may include, for example, any applications that provide services associated with social media, analytics, advertising, event management, customer relationship management, content creation and distribution, public relations, business generation, campaign management, and/or any other types of similar or related activities.

In an embodiment, charitable apps may include, for example, any applications that provide services associated with donations, charitable giving, crowdfunding, etc.

In an embodiment, platform utility apps may include, for example, any applications from a provider that allow an organization to utilize software applications, systems, or services that have been purchased or that are otherwise available from the provider. For example, a provider of an organizational data management system can allow an organization to access and utilize standard services and/or enhanced services via one or more of the platform utility apps. In some embodiments, the platform utility apps operate from or are directly integrated with applications, systems, and/or services obtained from a provider. For example, such platform utility apps can allow one or more users of an organization to customize a particular implementation or instance of provider software that is associated with the organization. In one example, one of the platform utility apps can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflows, triggers, tasks, reports, integrations, etc. In some embodiments, users may create and modify custom fields, relationships, rules, tables, entities, and any other various aspects of an organizational data management system in a utility application or otherwise using a custom computer language provided by the organizational data management system.

In an embodiment, other apps may include, for example, any types of applications that may be used by individuals and/or organizations. The other apps may include, for example, any other category of integration applications and/or any other types of applications that can be executed by a computing system or device.

In an embodiment, authorized users of an organization with the appropriate privileges may access one or more services of the application store computing system directly, for example, via a website, web page, desktop application, mobile application, and/or any other type of application to browse, view, search, compare, evaluate, download, install, configure, upgrade, uninstall, and/or perform any other types of activities associated with the integration applications or any other types of applications provided via the application store computing system. In some embodiments, authorized users of an organization with the appropriate privileges may access one or more services of the application store computing system indirectly, for example, through another application (e.g., application 312) and/or another computing system (e.g., computing system 310). In some embodiments, the application store computing system can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications for use by the organization. For example, any such user with the appropriate privileges may install one or more of the integration applications for the organization on the computing system 310 or any other computing systems or devices. Also, any such user with the appropriate privileges may configure integration data 314 associated with each of one or more integration applications. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to, the automation of processing performed across various third-party applications based on the organizational data 311. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example, to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications 340, 342, 344) that generate, utilize, process, and/or perform activities based on organizational data 311. Such integration generally allows an organizational data management system to orchestrate and automate processing of organizational data 311 and associated activities across numerous different applications that are not in communication or coordination with one another. In some embodiments, an organizational data management system can allow appropriate users of an organization (e.g., authenticated, authorized, privileged, etc.) to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. Also, an organizational data management system can comprise any one or more of organizational data 311, application(s) 312, application policy data 313, integration data 314, data structures 315, application object data 316, cloud development environment 317, custom language processing engine 318, computer instruction compiler 319, computer instruction generator 320, and/or any other information associated with managing, processing, and performing activities associated with organizational data 311. In addition, an organizational data management system may provide and utilize its own custom computer language that allows business users to access and perform various operations using simplified computer instructions based on the structure of organizational data 311. Further, an organizational data management system may include one or more operations associated with providing applications, user interfaces, and processing associated with generating instructions in a computer language. Such generated instructions then may be used to perform various activities within the organizational data management system and/or across one or more other applications (e.g., third-party application 340, third-party application 342, third-party application 344) running on one or more different computing systems (e.g., computing system 330, computing system 332, computing system 334).

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively comprise any one or more of organizational data 311, application(s) 312, application policy data 313, integration data 314, data structures 315, application object data 316, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

Figure 4:
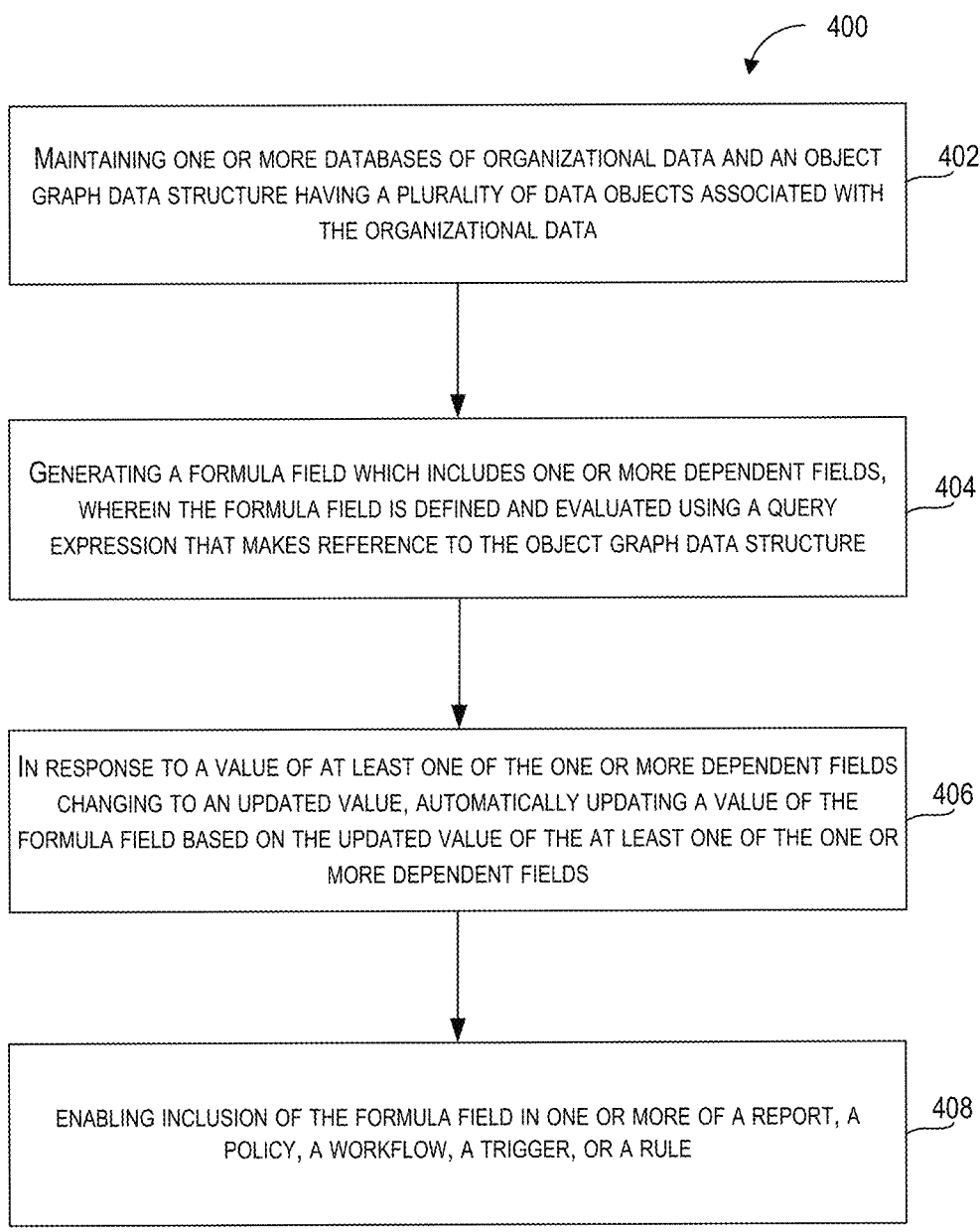
FIG. 4 depicts a flow diagram of an example method for enabling the including of a formula field in one or more of a report, a policy, a workflow, a trigger, or a rule, according to example embodiments of the disclosure.

FIG. 4 depicts a flow diagram of an example method for enabling the including of a formula field in one or more of a report, a policy, a workflow, a trigger, or a rule, according to example embodiments of the disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts operations performed in a particular order for purposes of illustration and discussion. As such, those skilled in the art, using the disclosures provided herein, will understand that various operations of any of the methods disclosed herein can be adapted, modified, rearranged, omitted, and/or expanded without deviating from the scope of the disclosure.

At 402, a computer system maintains one or more databases of organizational data and includes an object graph data structure having a plurality of data objects associated with the organizational data. In an embodiment, a computer system maintains one or more databases for storing and managing organizational data (e.g., organizational data 203, organizational data 311). The computer system also may store and maintain other various types of data in the same database and/or other databases. In an embodiment, the computer system maintains any one or more of rule data (e.g., rule data 204), organizational policy data (e.g., organizational policy data 205), application policy data (e.g., application policy data 206, application policy data 313), integration data (e.g., integration data 207, integration data 314), data structures (e.g., data structures 208, data structures 315), application object data (e.g., application object data 209, application object data 316) and/or other data in association with organizational data 311.

In an embodiment, the computer system is associated with an organizational data management system that maintains the organizational data 311 and various other supporting data. For example, the organizational data management system can serve as a system of record for organizational data 311 that is generated, modified, and utilized across multiple, non-related applications and computer systems. In an embodiment, the organizational data management system provides application user interfaces that allow various types of users, including non-technical users, to generate instructions in a custom computer language based on the organizational data 311. For example, users can utilize such application user interfaces to generate instructions for performing various types of operations based on the organizational data 311 within the organizational data management system and across one or more other applications integrated with the organizational data management system.

At 404, a computer system generates a formula field which includes one or more dependent fields, wherein the formula field is defined and evaluated using a query expression that makes reference to an object graph data structure. For example, the computer system may provide one or more application user interfaces (e.g., a single application user interface, multiple application user interfaces, a series of related application user interfaces, or any combination of application user interfaces) that enable users to provide input for defining the formula field, e.g., in a custom computer language and/or for performing any other types of operations.

In an embodiment, a data manager 312 (e.g., one of applications 312) is configured to enable a user to create custom fields within an organizational data management platform and to manage and configure metadata about the custom fields. For example, an example custom field which may be created includes a formula field that utilizes a custom query language (e.g., a resource query language).

In an embodiment, the computer system creates or otherwise generates the formula field that is based on information about one or more data objects associated with organizational data 311. For example, such data objects may be selectable in the application user interface and allow a user to graphically drill down and/or perform other operations to specify particular information and criteria for generating instructions in a custom computer language and/or performing any other types of operations. In some examples, an application user interface may include a code editor that allows a user to view statements generated in a custom computer language based on input and/or selections made via the application user interface. Such a code editor also may be provided to allow users to enter, modify, store, test, deploy, execute, and/or perform any other types of operations associated with statements or instructions in a custom computer language.

In some implementations, the data manager 312 enables a user to create custom fields within the organizational data management platform, for example, related to employees of the organization. In some implementations, the data manager 312 enables a user to create custom fields within the organizational data management platform, for example, related to any object within the organizational data management platform. An object may correspond to a node of an object graph data structure that provides information about entities, relationships, rules, constraints, and/or any other aspects of managing organizational data of the organization. Example object classes may include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

As an example custom field, a user may create a formula field that is calculated for each employee's pay stub, and the formula field may automatically be re-calculated or refreshed each time a new payroll is run. The formula field may be calculated for each employee instance.

As another example, courses or surveys created by users of the organizational data management platform using a custom query language may include formula fields associated with the courses or surveys in which the formula fields can be calculated based on values or attributes from any of the entities such as objects, records, etc. which are represented by the object graph data structure. Therefore, the formula field may be calculated by traversing across different information (e.g., across different nodes) from the object graph data structure.

For example, formula fields may be defined by a user to calculate a formula field for an employee based on the devices the employee is assigned, or formula fields may be defined by a user to calculate a formula field based on pay stubs paid during a predetermined period of time (e.g., the last six months). The data manager 312 may traverse across different objects within the object graph data structure and may calculate the formula field for a specified base object (e.g., such as for a particular employee, a group of employees, a department, an entire organization, a physical resource such as a device or vehicle, etc.).

As yet another example, a user may define a custom field (e.g., a formula field) that calculates a total compensation of an employee. The formula field may be based on data objects represented by the object graph data structure which are associated with an annual salary of the employee, bonuses, insurance benefits, stock benefits, retirement benefits, and the like. The formula field may be associated with a report, alert, notification, group policies, etc., such that a user (e.g., the employee, a manager, HR personnel, etc.) may receive information about the total compensation of the employee. For example, the report, notification, or alert may be generated in response to the total compensation exceeding a threshold value, falling below a threshold value, or simply changing (e.g., due to a change in stock price), etc. A user may also define a custom field (e.g., a formula field) that calculates respective total compensations for a group of employees, and may define that a report be generated for all employees having a total compensation greater than a threshold value or less than a threshold value.

At 406, a computer system, in response to a value of at least one of the one or more dependent fields changing to an updated value, automatically updating a value of the formula field based on the updated value of the at least one of the one or more dependent fields. For example, the custom field (e.g., formula field) may be associated with (e.g., conditioned on) dependent fields which cause the formula field to be refreshed or recalculated in response to a value of a dependent field changing. For example, the formula field may be automatically refreshed or recalculated if an employee's salary is changed, if a stock price for a stock in the employee's stock package changes, if an insurance plan is changed, and the like.

In some examples, the formula field is automatically updated and refreshed via dependency tracking implemented via the data manager application 312. In some implementations, the formula field may be calculated in the context of a report being generated. In other implementations, in accordance with an auto-refreshing mechanism provided via dependency tracking, the formula field may be calculated whenever a dependent field (which is implemented as part of the formula field) changes. For example, if a user wants to be alerted if a particular value of a formula field exceeds a particular threshold, dependency tracking enables automatic recalculating, caching, storing, and refreshing of the value of the formula field whenever one or more dependent fields (implemented as part of the formula field) change.

The data manager 312 may be configured to implement dependency tracking by storing a mapping of all the dependent fields which affect the value of the formula field. For example, the data manager may be configured to parse custom query language formulas during creation to obtain the mapping and store the mapping in a model in one or more databases (e.g., one or more memory devices 116). The data manager 312 may be configured to monitor the value of each of the dependent fields to determine whether to recalculate the formula field in response to one or more values of the dependent fields changing. For example, the data manager 312 may be configured to monitor the value of one or more of the dependent fields continuously, at preset time intervals (e.g., every minute, every 30 minutes, every hour, every day, etc.), or in response to some event occurring (e.g., a change in status of the employee, a performance evaluation, dates associated with securities that are part of the employee's compensation such as a dividend payout date or a date in which an earnings report is to be released to the public, dates associated with an enrollment period for benefits, etc.). The data manager 312 may be configured to search for formula fields which are reliant upon the dependent field which has changed using a reverse index and then recalculate each of the formula fields which are mapped to the dependent field which has changed according to the updated value of the dependent field. For example, in some implementations the data manager 312 may be configured to evaluate and re-calculate formula fields which are reliant upon the dependent field which has changed and cache results of the recalculated formula fields and of the value of the changed dependent field. For example, a final result of the formula field may be stored in cache as a model (e.g., using schema including an ID, calculated field ID, a derived model object reference field, and a value). For example, one or more intermediate results that are obtained to obtain the final result of the formula field may also be stored in cache. As an example the formula field CF1=2*annual_salary/SUM(annual_salaries in your department), the second part (aggregated annual salaries at department level) may be cached.

For example, in some implementations the data manager 312 may be configured to recalculate the formula field by recalculating each field incorporated in the formula field or the data manager may be configured to recalculate the formula field by using previous values from each field incorporated in the formula field other than the dependent field which has changed. For example, when a formula field is to be applied to a group of employees in some implementations the data manager 312 may be configured to recalculate the formula field for all of the employees in the group when a dependent field value changes for at least one of the employees. For example, when a formula field is to be applied to a group of employees in some implementations the data manager 312 may be configured to recalculate the formula field for only those employees in the group in which a dependent field value associated with those employees has changed.

In some implementations, data manager 312 may be configured to analyze whether mapping of a dependent field to a custom field (e.g., formula field) should be changed or deleted in response to the deletion of a custom field that incorporates the dependent field, in response to a custom field that incorporates the dependent field being moved or changed, or any change to a custom field that incorporates the dependent field which may affect the functionality of the dependent field or other fields which could be impacted by the change to the custom field.

At 408, a computer system enables inclusion of the formula field in one or more of a report, a policy, a workflow, a trigger, or a rule. In some implementations, the formula field may be implemented by the data manager 312 in a recipe or workflow which includes various elements (such as formula fields or other custom fields) that are interrelated with one another. The recipe may be part of a recipe library which include recipes for various situations (e.g., generating a task for a manager when a remote employee moves to another state, sending an alert when a device has not been returned a predetermined number of days after return packaging has been delivered to the employee, sending a notification to an employee and manager when a document has not been signed, generating and sending an alert when an urgent task is assigned to an employee on leave, sending an alert to a manager when an employee's device has been offline for a predetermined period of time, etc.). Users may modify existing recipes to integrate a generated formula field or create a new recipe which integrates the generated formula field.

For example, the computer system may execute instructions generated in the custom computer language to perform one or more operations based on executing the instructions generated in the custom computer language. For example, one or more operations may cause an application or system to perform one or more operations internally, may cause the application or system to perform one or more operations in association with an external application or system (e.g., based on an integration, etc.), or may cause the application or system to perform one or more operations both internally and with an external application or system. In an example, the one or more operations may include performing any operation available in a system of record, any operation available from an application provided for use with the system of record, and/or any operation available from a third-party application integrated with the system of record. Some examples of operations may include, but are not limited to, updating organizational data 311, advancing progression of a workflow, completing a workflow, assigning a task, updating status of a task, completing a task, initiating evaluation of another trigger, firing another trigger, approval of a request, denial of a request, generation of one or more alerts, transmission of one or more alerts, generation of one or more messages, transmission of one or more messages, generating and sending a request to another application, initiating an action or event in another application, installing an application on a user device, applying a software update to a user device, setting one or more configurations on a user device, setting one or more configurations for each of one or more applications provided to a user, setting one or more configurations for each of one or more applications on a user device, and/or performing any other types of actions within a system of record and/or across any number of applications.

Additional aspects of the data manager 312 may include the following. For example, in some implementations, a formula field may be calculated by traversing across different information from the object graph data structure according to a permissions system of the organizational data management platform. For example, the permissions system may be another one of the applications 312. For example, when the formula field is calculated the data manager 312 may be configured to determine or verify that the user requesting the calculation has permission to access information corresponding to various nodes or objects of the object graph data structure that are used to perform the calculation via the permissions system. For example, if a user defines a custom field (e.g., a formula field) that calculates a total compensation of an employee that is based on data objects represented by the object graph data structure which are associated with an annual salary of the employee, bonuses, insurance benefits, stock benefits, retirement benefits, and the permissions system indicates the user does not have permission to access the stock benefits data object, the data manager 312 may take various actions. For example, the data manager 312 may prevent the user from seeing a result of the calculation, may prevent the calculation from being performed at all, may notify the user that they do not have access to a particular data object (e.g., specifically the data object corresponding to the stock benefits), may provide a partial calculation which omits data that the user is not permitted to access, and combinations thereof. In some implementations, the user may be permitted to define the custom field and may not be permitted to view a result of the calculation while other users who have the required permissions may be able to view the result of the calculation. In some implementations, the user may not be permitted to define a custom field (e.g., formula field) which includes any fields that the user does not have permission to access the corresponding information associated with the associated data object. For example, the data manager 312 may be configured to check or verify whether a user has permission to access information associated with a data object that is associated with a field that the user attempts to incorporate into the formula field via the permissions system. In some implementations, the user may not be provided or shown fields to incorporate into the custom field (e.g., formula field) where the user does not have permission to access the corresponding information associated with the associated data object. The permissions system may store a mapping of permissions with respect to devices and/or users of the data manager 312 and/or organizational data management platform in relation to data objects from the object graph data structure, for example in one or more databases. The permissions system may store of allowed activities with respect to devises and/or users of the data manager 312 and/or organizational data management platform in relation to data objects from the object graph data structure, for example in one or more databases.

Additional aspects of the data manager 312 may include the following. For example, in some implementations, in some implementations, the organizational data management platform (e.g., the data manager 312) may include default formula fields that calculate a value which may be a standard value that may be generally applicable to or often used in connection with employees or other resources of the organization. For example, according to some aspects of the disclosure a user may be enabled (e.g., granted permission via the permissions system) to overwrite one or more of the default formula fields (e.g., by deleting fields, adding fields, modifying fields, etc.) to create a customized default formula field.

Additional aspects of the data manager 312 may include the following. For example, in some implementations, users of the organizational data management platform (e.g., the data manager 312) may create custom fields (e.g., formula fields) based on information that is imported via the data manager 312 from an external party (third party) and for example the object graph data structure. For example, users may import any data from another system and integrate that data into the organizational data management platform. For example, the imported data may be associated with the object graph data structure so that the formula fields can be defined by the user based on data that was previously not accessible by the organizational data management platform and particularly the data manager.

For example, a user may have retirement account with an external provider (third party) which stores data or information not accessible to the organizational data management platform. The user may wish to include the retirement account data in organizational reports, employee data, a total compensation calculation, and the like. For example, the user may import such third party data via the data manager 312 (e.g., via a file based import, file transfer, an application programming interface, etc.) and enable the third party data to be stored in a database and/or made available to the data manager 312 while establishing a relationship between the third party data and the data existing in the data manager (e.g., data objects associated with the object graph data structure). For example, the user may define or create custom data objects based on the third party data which may augment or be added to the object graph data structure. For example, the user may define or create custom fields (e.g., formula fields) based on the third party data alone or together with other data previously existing in the data manager 312 (e.g., data objects associated with the object graph data structure), which may be native data for example. For example, the third-party and third-party data may be associated with any one of computing systems 330, 332, 334.

Figure 5:
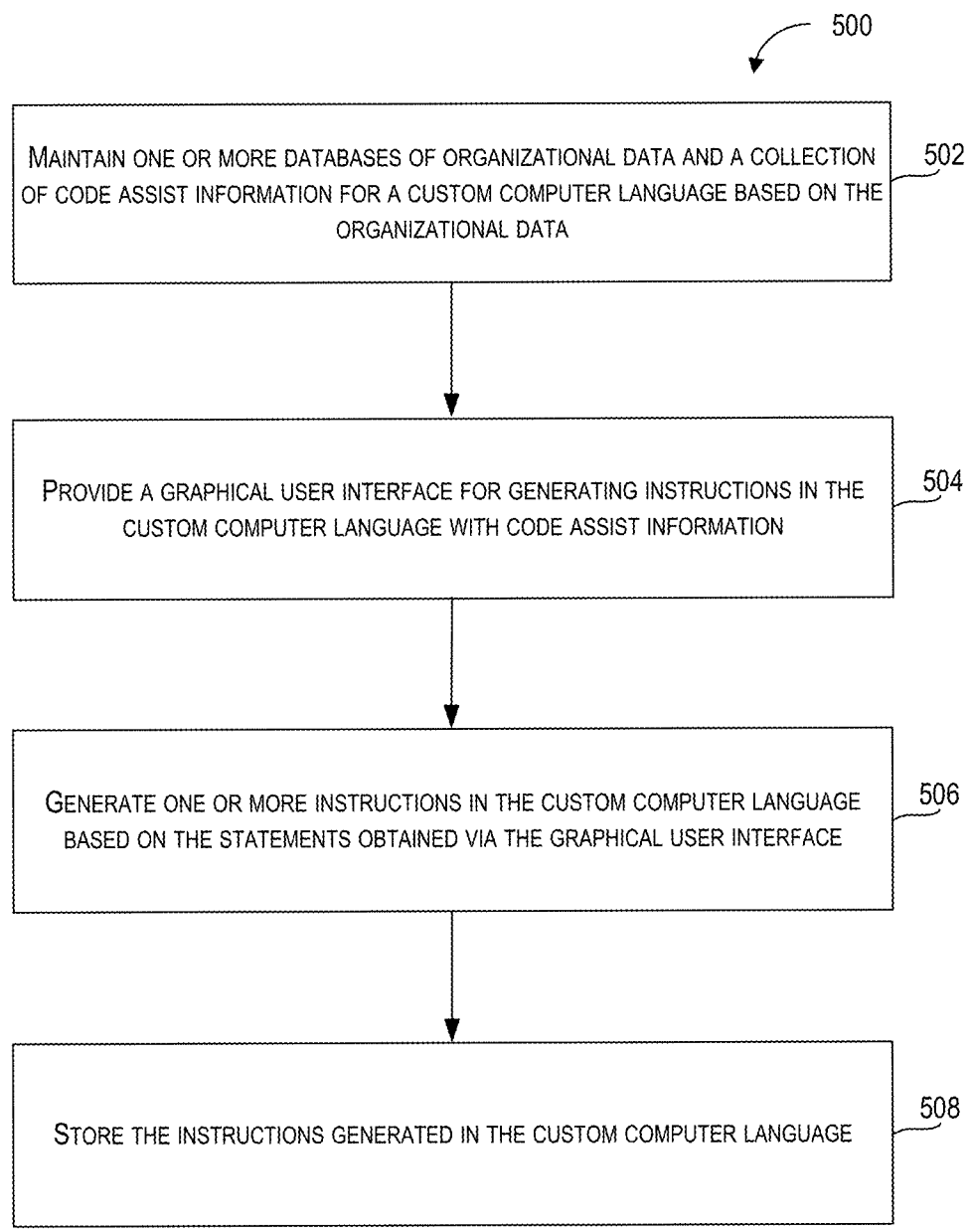
FIG. 5 depicts a flow diagram of an example method for providing an application user interface with a code editor for generating instructions in a computer language, according to example embodiments of the disclosure.

FIG. 5 depicts a flow diagram of an example method for providing an application user interface with a code editor for generating instructions in a computer language, according to example embodiments of the disclosure. One or more portions of the method 500 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 500 can be executed or implemented as an algorithm on the hardware devices or systems disclosed herein. FIG. 5 depicts operations performed in a particular order for purposes of illustration and discussion. As such, those skilled in the art, using the disclosure provided herein, will understand that various operations of any of the methods disclosed herein can be adapted, modified, rearranged, omitted, and/or expanded without deviating from the scope of the disclosure.

At 502, a computer system maintains organizational data and a collection of code assist information for a custom computer language that is based on the organizational data. In an embodiment, a computer system maintains organizational data 311 and other information associated with an organizational data management system. For example, additional information maintained by the computer system may include, but is not limited to, rule data, organizational policy data, application policy data 313, integration data 314, data structures 315, application object data 316 and/or other data associated with organizational data 311.

In an embodiment, a computer system also maintains one or more collections of code assist information associated with a custom computing language based on the organizational data 311. For example, the custom computing language may be provided by a system of record to enable users to perform various operations involving organizational data 311. In an example, the code assist information may be stored for use with one or more application user interfaces that enable users to input, enter, or otherwise generate instructions in the custom computer language. For example, one or more portions of code assist information may be included with, referenced by, or provided via any one or more application user interfaces.

In an embodiment, code assist information generally may refer to any type of information that assists a human in creating instructions in a computer language (e.g., such as a custom computer language). For example, code assist information may include visual, audible, and/or other information that aids a human in providing correct and complete input via an application user interface for generating instructions in a custom computer language. Such code assist information may include, but is not limited to information about organizational data 311, information about data objects associated with the organizational data 311 (e.g., attributes, constraints, etc.), information about relationships between data objects associated with the organizational data 311, keywords of the custom programming language, available variables, available functions, available procedures, available third-party applications, available integrations between an organizational data management system and respective third-party applications, data objects associated with integrated third-party applications, operations available from integrated third-party applications, etc. In some examples, code assist information may be provided with and presented by an application user interface. In some examples, an application user interface may be configured to obtain, reference, or utilize code assist information to provide hints via the application user interface, to provide autocompletion of statements via the application user interface, to provide code snippets via the application user interface, to provide example code templates via the application user interface, etc. Further, one or more portions of such code assist information may be provided statically as part of the application user interface, and/or provided dynamically based on one or more of context, contextual information, and/or user interaction with the application user interface.

Figure 6C:
FIG. 6C depicts an illustration of an example application user interface that allows browsing of available functions and associated information for generating instructions in a computer language, according to example embodiments of the disclosure.

At 504, a computer system provides a graphical user interface for generating instructions in the custom computer language with code assist information. In an embodiment, the application user interface includes a code editor that enables a user to input, enter, insert, build, or otherwise provide statements in a custom computer language. For example, such statements may be a set or collection of programmatic statements in a custom computer language for performing operations associated with organizational data 311. FIG. 6A, FIG. 6B, and FIG. 6C provide examples of application user interfaces that include or that are associated with a code editor.

FIG. 6A depicts an illustration of an example application user interface 600 with field assistance for generating instructions in a computer language, according to example embodiments of the disclosure. Example application user interface 600 includes descriptive information 602 about the interface, a field name input control 604, field description input control 606, a code editor 608 (e.g., formula editor), an insert function control 610, user input 612, code assist information 614, and a data type selection control 616.

In an embodiment, the descriptive information 602 generally may provide information describing an application user interface. In example application user interface 600, the descriptive information 602 indicates that the application user interface is directed to configuring a calculated field. For example, a calculated field may be added to any data object associated with organizational data 311. The field name input control 604 generally enables a user to assign a name to a calculated field. The field description input control 606 generally enables a user to provide a brief description associated with a calculated field. The code editor 608 generally enables a user to enter statements in a custom query language. The insert function control 610 generally enables a user to access a collection or library of functions graphically for selection and insertion into the code editor 608. The user input 612 represents example input information entered into the code editor 608 by a user. The code assist information 614 provides graphical selections based on context of the user input 612 for aiding a user in forming statements in the custom computer language. For example, code assist information 614 may present relevant variables, functions, and or other information while excluding other irrelevant information based on existing context associated with an application user interface. The data type selection control 616 is provided to enable a user to specify a data type for the calculated field that is being created. In some examples, a user can access an application user interface for inserting a function based on selecting the insert function control 610. Also, statements from the code editor 608 may be processed by a custom language processing engine 318. For example, such statements may be compiled by a computer instruction compiler 319 and used to generate instructions in the custom computer language by a computer instruction generator 320. In some examples, such generated instructions may be expanded, optimized, and/or otherwise different in some way compared to certain types of simplified instructions that may be entered via the code editor.

In an embodiment, one or more templates may be provided or shared among users as a starting point for configuring statements or instructions in a custom computer language. Such code templates and/or any other types of templates may be provided or otherwise made available via a search interface. Also, such templates may be provided or otherwise made available via a navigable user interface that may include an organized list of folders or other objects that enable multiple different users to define, redefine, use, reuse, and/or perform any other types of activities relating to instructions in a computer language.

FIG. 6B depicts an illustration of an example application user interface 630 with function assistance for generating instructions in a computer language, according to example embodiments of the disclosure. Example application user interface 630 includes the descriptive information 602, the field name input control 604, the field description input control 606, the code editor 608 (e.g., formula editor), the insert function control 610, and the data type selection control 616 described above with respect to example application user interface 600. In addition, example application user interface 630 includes example user input 632 in the code editor 608, pop-up code assist information 634 based on context associated with the user input 632 in the code editor 608, and detailed code assist information 636 based on context associated with the user input 632 in the code editor 608.

In an embodiment, a user begins to enter text associated with a "SELECT" function as user input 632 into code editor 608. Example application user interface 630 receives and processes the user input. For example, an application user interface may, for example by itself or in conjunction with a server process, analyze user input 632 as the user enters or during a pause after the user enters input into code editor 608. In an example, the user input may be analyzed to determine and obtain relevant information that is to be provided via the application user interface based on context of the user input 632. For example, the example application user interface 630 can determine, obtain, and provide pop-up code assist information 634, detailed code assist information 636, and/or any other type of code assist information based on context and user input 632.

FIG. 6C depicts an illustration of an example application user interface 650 that allows browsing of available functions and associated information for generating instructions in a computer language, according to example embodiments of the disclosure. Example application user interface 650 includes a search interface 652, categories of data types 654, a listing of text-based functions 656, and code assist information 658 for the concatenate function. In an embodiment, a user may navigate to, launch, or otherwise invoke example application user interface 650. For example, a user may access example application user interface 650 based on selecting the insert function control 610 of example application user interface 600 of FIG. 6A or example user interface 630 of FIG. 6B.

In an embodiment, a user can search for a particular function using example application user interface 650 based on entering input into and activating search interface 652. The user also can browse available functions based on selecting a category from the categories of data types 654. In example application user interface 650, a user has selected "Text" to view text-based functions, which are included in the listing of text-based functions 656. The user also has selected the "CONCATENATE" function from the listing of text-based functions 656, which displays associated code assist information 658 for the selected function. The user may continue to browse available functions and insert a desired function or cancel the process. In an example, the user selects the "CONCATENATE" function, which then may be automatically inserted into a code editor for use by the user (e.g., code editor 608 of FIG. 6A or FIG. 6B).

In an embodiment, an application user interface may provide access to one or more template formulas that may be used and/or customized for use in association with a custom computer language. For example, template formulas may be provided by any one or more of an organizational data management system for use by users of one or more different organizations. Organizations also may define template formulas for use by users of an organizational data management system. Organizations also may share template formulas with other organizations. As such, template formulas generally may be assigned or otherwise associated with permissions used to provide or restrict access to appropriate parties and users (e.g., for use by certain users or roles within an organization, for use by users of an organization, shared with partner organizations, shared with any organization, etc.). In various examples, template formulas can be shared and distributed in a manner that protects and preserves privacy of sensitive, underlying organizational data 311. In some examples, one or more approvals (e.g., administrative approvals) may be required before template formulas can be shared with one or more other users, groups, roles, organizations, and/or publicly. In some examples, template formulas may include template fields that generalize user defined fields for use with different applications and user groups. For example, template fields can be generally defined and mapped or otherwise associated with each of one or more particular versions of different respective applications. In some examples, a user may define a template formula that references, is based on, or is otherwise provided for use with one or more particular versions of any number of applications.

At 506, a computer system generates one or more instructions in the custom computer language based on the statements obtained from the graphical user interface. In an embodiment, a computer system receives or otherwise obtains one or more statements from an application user interface. For example, such statements may be received or obtained based on user input provided via a code editor. In one example, a custom language processing engine 318 receives statements, a computer instruction compiler 319 compiles the statements based on rules associated with a custom computer language, and a computer instruction generator 320 generates instructions in the custom computer language for execution by an organizational data management system.

In an embodiment, a computer instruction generator 320 of a computer system analyzes statements in a custom computer language based on one or more data structures 315 associated with the organizational data 311. In various embodiments, the computer instruction generator 320 determines, based on the analyzing of the data structures 315, one or more data joins and/or other operations to add or otherwise include when generating associated instructions in the custom computer language. For example, statements provided via an application user interface code editor may be simplified programmatic calls associated with a custom computer language. Such simplified programmatic calls may allow users to write instructions in a custom computer language based on organizational data 311 without knowledge of or specifying underlying data joins, applications, integrations, computer systems, data stores, etc. In various examples, computer instruction generator 320 analyzes statements in a custom computer language and then generates expanded instructions in the custom computer language that can be executed by an organizational data management system. In one example, computer instruction generator 320 may determine that expansion or modification to statements is unnecessary, for example, when statements in a custom computer language include underlying information (e.g., one or more data joins based on relationships between data objects).

In an embodiment, computer instruction generator 320 also may generate instructions in other computer languages based on statements received in a custom computer language. For example, the computer instruction generator 320 can generate instructions in one or more different computer languages for execution with another application, system, and/or data store based on analyzing instructions of a custom computer language in view of one or more data structures 315. Instructions generated in one or more other computing languages may include one or more data joins and/or one or more other types of operations identified based on analyzing statements or instructions in a custom computer language in view of one or more data structures 315.

At 508, a computer system stores the instructions generated in the custom computer language. In an embodiment, the generated instructions may be stored in one or more databases associated with an organizational data management system. For example, the generated instructions may be deployed and enabled for use with the organizational data management system. The generated instructions then can be executed to perform one or more operations involving the organizational data management system and/or one or more separate applications or systems based on organizational data 311.

Figure 7:
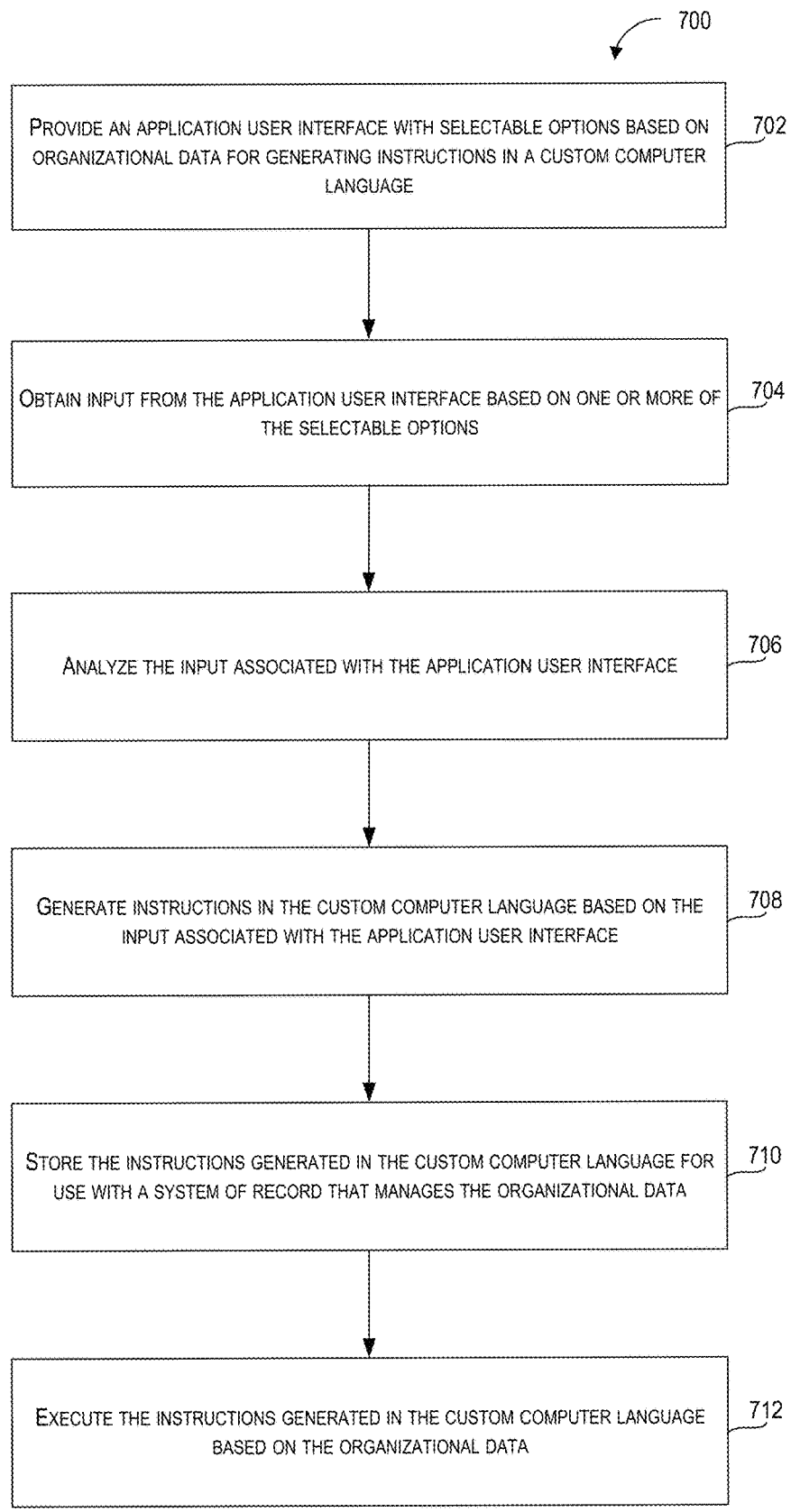
FIG. 7 depicts a flow diagram of an example method for providing an application user interface with selectable options for generating instructions in a computer language, according to example embodiments of the disclosure.

FIG. 7 depicts a flow diagram of an example method for providing an application user interface with selectable options for generating instructions in a computer language, according to example embodiments of the disclosure. One or more portions of the method 700 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 700 can be executed or implemented as an algorithm on the hardware devices or systems disclosed herein. FIG. 7 depicts operations performed in a particular order for purposes of illustration and discussion. As such, those skilled in the art, using the disclosures provided herein, will understand that various operations of any of the methods disclosed herein can be adapted, modified, rearranged, omitted, and/or expanded without deviating from the scope of the disclosure.

At 702, a computer system provides an application user interface with selectable options based on organizational data for generating instructions in a computer language. In an embodiment, a computer system provides one or more application user interfaces that guide a user through visually building and generating instructions in a custom computer language. In some examples, such application user interfaces may be organized in a progressive series of application user interfaces associated with a code generation wizard or assistant. In addition, such application user interfaces generally may present data objects associated with organizational data 311 and enable users to visually select and navigate such data objects to generate instructions in a custom computer language.

In an embodiment, a computer system creates each of one or more application user interfaces for generating instructions in a custom computer language. For example, the computer system may analyze one or more of organizational data 311, data structures 315, and/or other available data to determine information about data objects to include or use in generating respective application user interfaces. In various examples, the computer system obtains information about data objects and associated relationships between such data objects to generate each of one or more portions of an application user interface. For example, such information may be used to define and generate selectable objects, controls, and/or other information representing structure of the organizational data for an application user interface. In various examples, the computer system creates and provides each application user interface to a computing device of a user. FIG. 8A, FIG. 8B, FIG. 9A, FIG. 9B, FIG. 9C, FIG. 9D, FIG. 9E, and FIG. 9F provide examples of application user interfaces with selectable options based on organizational data.

Figure 8A:
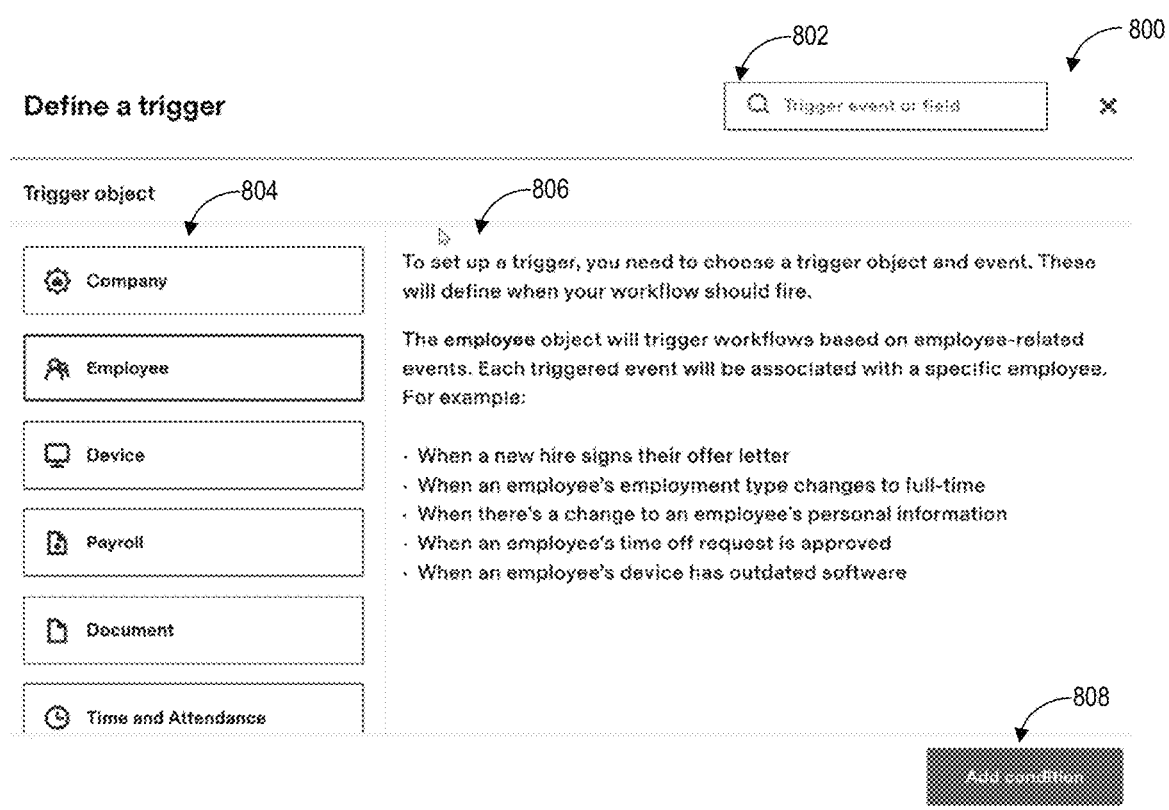
FIG. 8A depicts an illustration of an example application user interface with selectable options based on organizational data for generating instructions in a computer language, according to example embodiments of the disclosure.

As an example, FIG. 8A depicts an illustration of an example application user interface 800 with selectable options based on organizational data for generating instructions in a computer language, according to example embodiments of the disclosure. For example, example user interface 800 may be one of multiple application user interfaces that enable a user to configure various aspects of an application trigger (e.g., trigger conditions, trigger operations, etc.).

In example application user interface 800, a search interface 802 is provided to enable a user to search for one or more of available trigger objects, available fields associated with trigger objects, available events associated with trigger objects, and/or any other type of information available from a system of record for configuring triggers. In some examples, the search interface 802 may provide access to preconfigured trigger templates that a user may utilize, for example, as a starting point when configuring a trigger. Such trigger templates and/or any other types of templates also may be provided, for example, via a navigable user interface that may include an organized list of folders or other objects that enable multiple different users to define, redefine, use, reuse, and/or perform any other types of activities relating to trigger templates.

Example application user interface 800 also includes a listing of objects 804 available for selection by a user. For example, a listing of objects 804 may be generated based on any one or more types of data objects utilized by a system. In one example, a listing of objects 804 is generated based on identifying one or more types of data objects maintained by a system of record. For example, such data objects may be identified and presented based on analyzing one or more data structures 315 associated with a system of record. In addition, example application user interface 800 includes assistance information 806 to aid a user in understanding or performing one or more activities. One or more portions of such assistance information 806 may be updated based on a selected data object in the listing of data objects 804.

Further, information provided to a user via an application user interface may be based on any one or more of organization subscriptions with third-party applications, configured integrations with third-party applications, permissions of a user, custom entities configured for an organization, custom fields configured for an organization, etc.

Figure 8B:
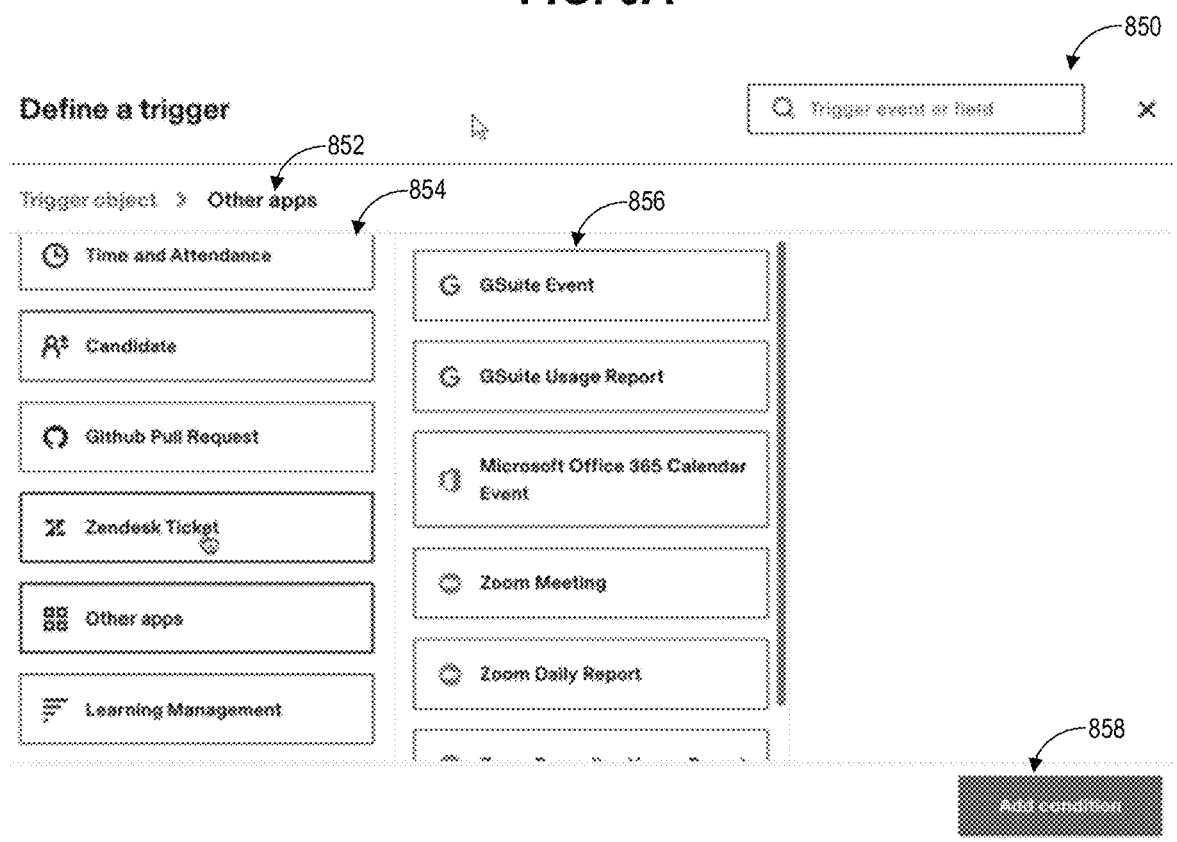
FIG. 8B depicts an illustration of an example user interface with selectable options based on organizational data and integrated third-party applications for generating instructions in a computer language, according to example embodiments of the disclosure.

As an example, FIG. 8B depicts an illustration of an example application user interface 850 with selectable options based on organizational data 311 and integrated third-party applications for generating instructions in a computer language, according to example embodiments of the disclosure.

In example application user interface 850, selectable options associated with information and events from applications other than a system of record (i.e., other apps 852) are. Included. Example user interface 850 includes multiple third-party applications in an example listing of objects 854, which may be used in configuring a trigger. Example user interface 850 also includes an example listing of third-party events and reports 856, which may be used in configuring a trigger. In various examples, such third-party application information and events may be determined based on analyzing one or more of organizational data 311, integration data 314, data structures 315, and/or any other available data that can be used to generate application user interfaces.

Figure 9A:
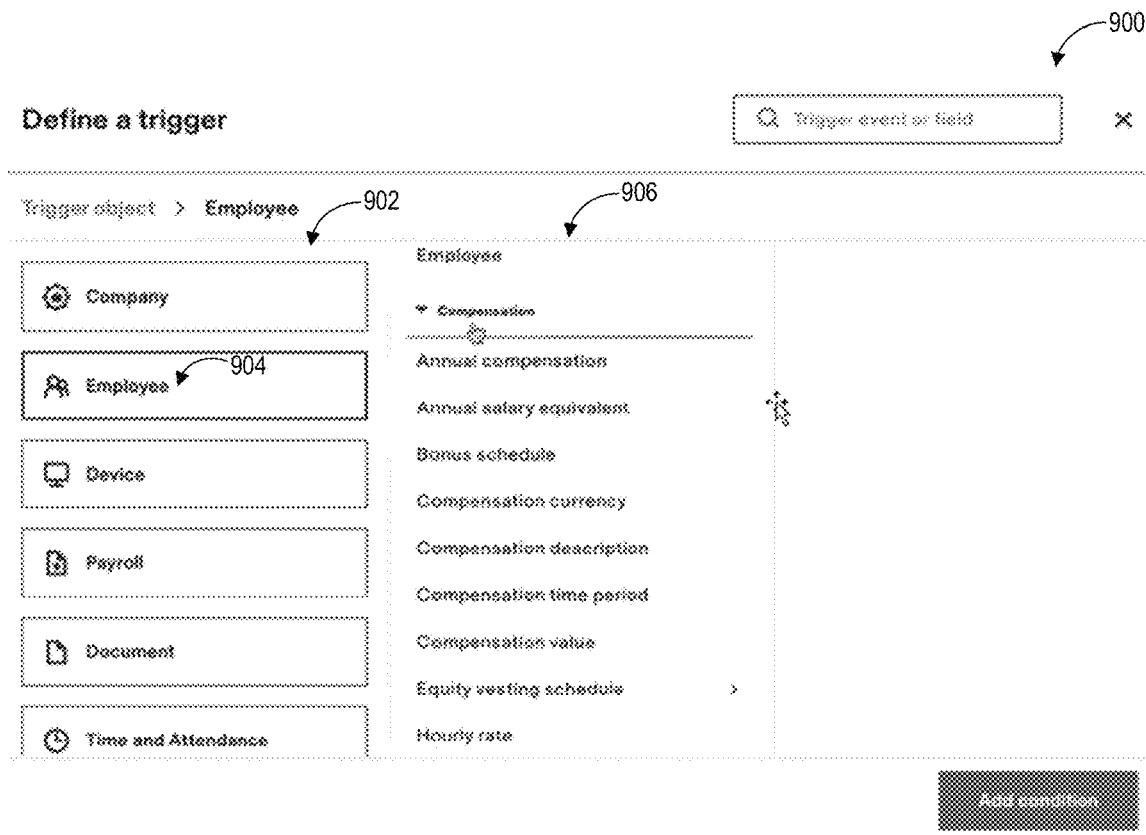
FIG. 9A depicts an illustration of an example application user interface with selectable options based on organizational data for generating instructions in a computer language, according to example embodiments of the disclosure.

As an example, FIG. 9A depicts an illustration of an example application user interface 900 with selectable options based on organizational data for generating instructions in a computer language, according to example embodiments of the disclosure. Example user interface 900 may be provided as part of one or more application user interfaces that enable users to create and configure executable instructions for trigger application objects graphically. In example application user interface 900, a user has started to define a trigger object based on a selected employee data object 904 in a listing of selectable data objects 902 associated with a system of record for managing organizational data 311.

In the example application user interface 900, the user is presented with a listing of selectable data objects 902 (e.g., representing current data objects available in an organizational data management system that manages organizational data 311). In an example, once the user selects one of the data objects (e.g., the selected employee data object 904) in the listing of selectable data objects 902, the user is presented with an additional interface 906 of selectable data object attributes associated with the selected data object (e.g., selectable attributes of the selected employee data object 904). For example, the additional interface 906 allows a user to select a category of attributes associated with a data object (e.g., a category of compensation-related attributes of an employee data object associated with the system of record). The additional interface 906 then provides a listing of selectable attributes associated with the current, selected category of attributes (e.g., a listing of specific employee data object attributes in the compensation category). In various examples, one or more categories and/or attributes related to a data object may be determined based on analyzing one or more data structures 315 and/or other data associated with a system of record for managing organizational data 311.

Figure 9B:
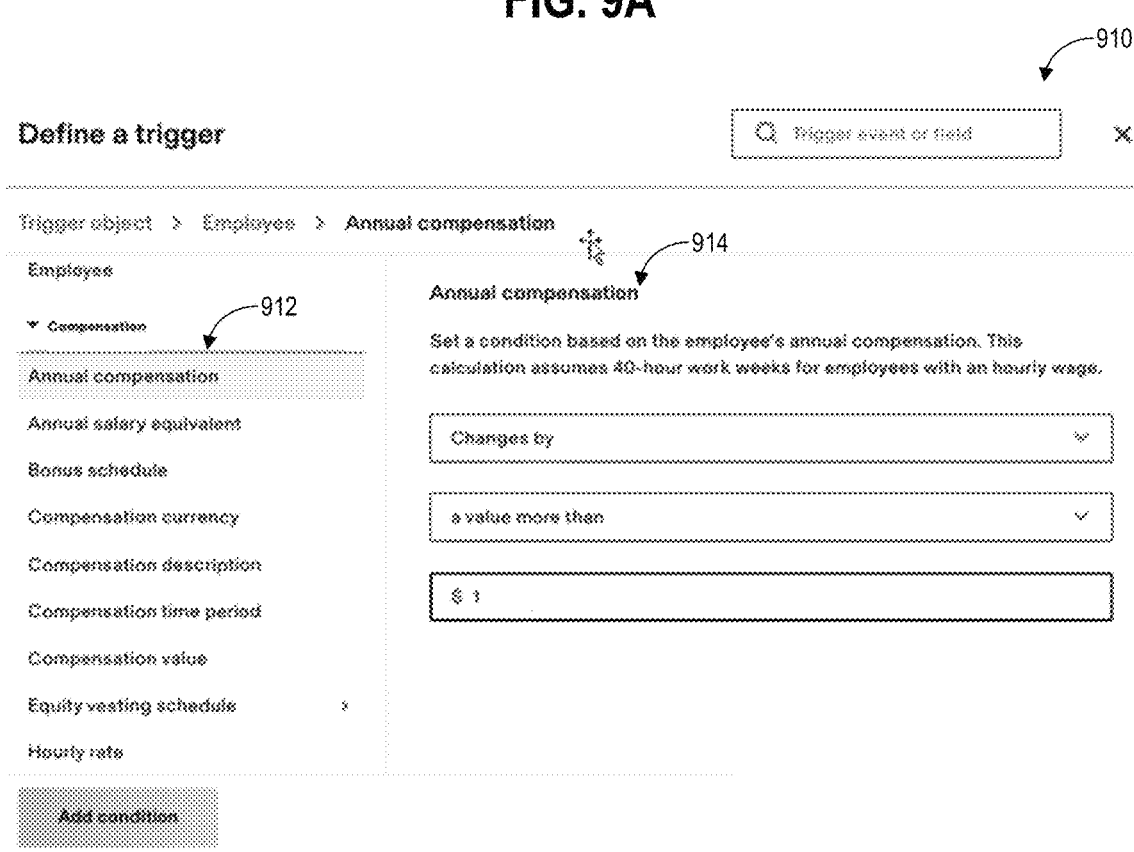
FIG. 9B depicts an illustration of an example application user interface with selectable options based on organizational data for generating instructions in a computer language, according to example embodiments of the disclosure.

FIG. 9B depicts an illustration of an example application user interface 910 with selectable options based on organizational data for generating instructions in a computer language, according to example embodiments of the disclosure. Continuing with the example from FIG. 9A above, example application user interface 910 shows a user selection of the annual compensation attribute 912 of the employee data object. In addition, the user is provided with an additional interface 914 that enables the user to configure a specific condition based on annual compensation of the employee data object. The user then may adjust any one or more of the various options presented by the additional interface 914 and add the desired condition to the trigger. In some examples, the user may continue one or more additional conditions associated with the employee data object, one or more entities associated with the employee data object (e.g., devices, applications, etc.), one or more third-party applications, and/or any other data objects supported by a system of record. Once the user has finished adding conditions for the trigger, then the user can configure one or more operations for the trigger. Additional illustrations of example application user interfaces with selectable options are illustrated in FIGS. 9C, 9D, 9E, and 9F.

Figure 9C:
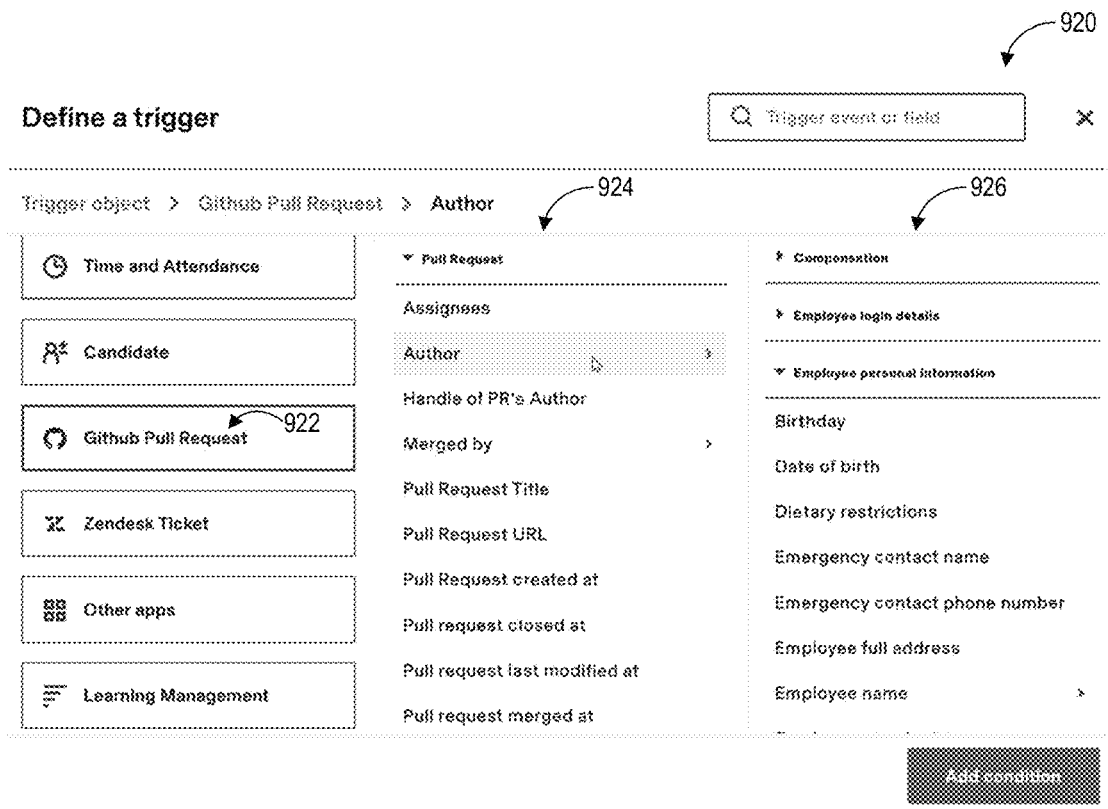
FIG. 9C depicts an illustration of an example application user interface with selectable options based on organizational data for generating instructions in a computer language, according to example embodiments of the disclosure.

FIG. 9C depicts an illustration of an example application user interface 920 with selectable options based on organizational data for generating instructions in a computer language, according to example embodiments of the disclosure. In example user interface 920, a user has selected a third-party application data object 922 from a list of data objects. A first additional interface 924 and a second additional interface 926 listing selectable attributes associated with the selected third-party application data object 922 are presented. In particular, the first additional interface 924 lists attributes of the selected third-party application data object 922 pertaining to pull requests. The second additional interface 926 includes three categories of additional attributes based on the selected "Author" attribute in the first additional interface 924 (i.e., "Compensation," "Employee login details," and "Employee personal information"). For example, the "Author" attribute of the third-party application data object can be associated with an employee data object (e.g., in organizational data 311 and associated data structures 315 because employees can author source code). Such association between a third-party application data object attribute and another data object then may be used, for example, to generate and provide selectable attributes for defining a trigger condition provided in the additional interface 926.

Figure 9D:
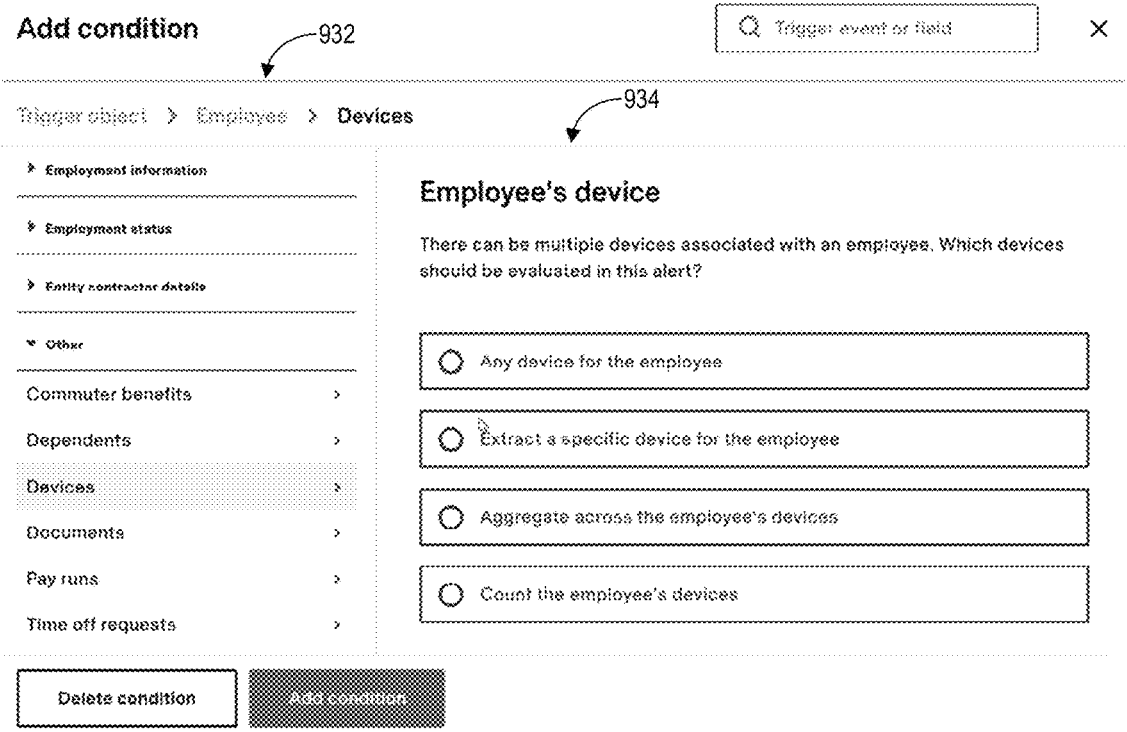
FIG. 9D depicts an illustration of an example application user interface with selectable options based on organizational data for generating instructions in a computer language, according to example embodiments of the disclosure.

FIG. 9D depicts an illustration of an example application user interface 930 with selectable options based on organizational data for generating instructions in a computer language, according to example embodiments of the disclosure. In example application user interface 930, a user is in the process of defining a trigger condition. In a first portion 932 of the example user interface 930, a user has been presented with multiple categories of attributes and objects associated with an employee data object in organizational data 311. For example, categories of attributes generally may be associated with the employee data object. In addition, one or more data objects, such as "Devices" and "Documents" can be provided, for example, based on a relationship between each respective data object and the employee data object (e.g., as provided in the organizational data 311 or data structures or any other information indicating relationships between data objects in the organizational data).

In an embodiment, an organization may define a relationship between an employee data object and a devices data object to indicate that an employee of the organization may be assigned or otherwise associated with any number of devices (e.g., zero or more devices). An organization also may define a similar relationship between the employee data object and a documents data object. Various other types of relationships and associated cardinality can be defined between any two or more data objects.

In the first portion 932 of example user interface 930, a user has selected "Devices" based on an associated data object related to the employee data object. In addition, a second portion 934 of example user interface 930 is presented with multiple, selectable options based on a relationship between the employee data object and the devices data object (e.g., indicating that an employee can have any number of devices). Such selectable options may be tailored based on the cardinality of a relationship between data objects and may be provided to facilitate configuration of application data objects and generation of associated instructions in a custom computer language.

Figure 9E:
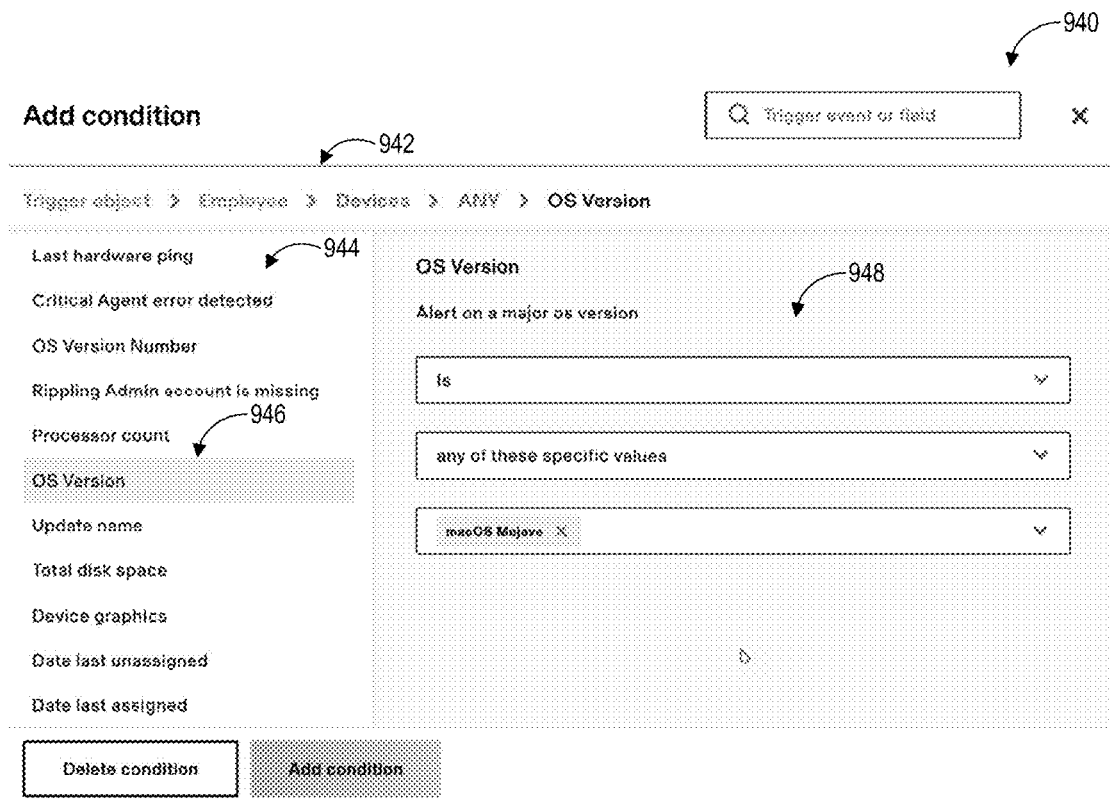
FIG. 9E depicts an illustration of an example application user interface with selectable options based on organizational data for generating instructions in a computer language, according to example embodiments of the disclosure.

FIG. 9E depicts an illustration of an example application user interface 940 with selectable options based on organizational data for generating instructions in a computer language, according to example embodiments of the disclosure. In example application user interface 940, a user is defining a condition for a trigger object across multiple data objects (i.e., an employee data object and a devices data object) based on a relationship between the data objects in organizational data 311 maintained by a system of record. For example, such a relationship may indicate that all employees of an organization may be assigned or otherwise associated with any number of computing devices (i.e., zero or more assigned computing devices).

Example application user interface 940 includes an application user interface path 942 illustrating how a user has navigated a series of application user interfaces for generating instructions in a custom computer language. Example application user interface 940 also includes a listing of attributes 944 associated with a "devices" data object in the organizational data. In addition, the user has selected the "OS Version" attribute 946 to configure an associated trigger condition. Further, a corresponding additional interface 948 is presented to allow the user to configure the specific trigger condition based on the selected attribute 946.

Figure 9F:
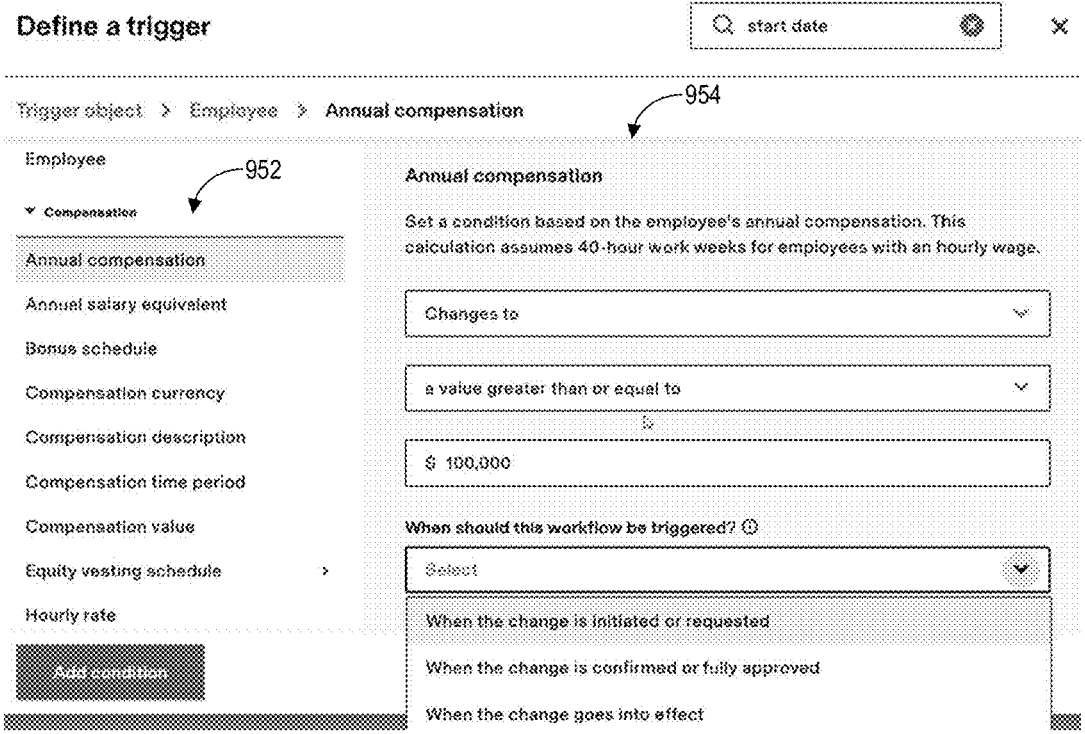
FIG. 9F depicts an illustration of an example application user interface with selectable options based on organizational data for generating instructions in a computer language, according to example embodiments of the disclosure.

FIG. 9F depicts an illustration of an example application user interface 950 with selectable options based on organizational data for generating instructions in a computer language, according to example embodiments of the disclosure. In example application user interface, a user is defining a trigger condition based on employee compensation. Example user interface includes a first portion 952 indicating the selection of the "Annual compensation" attribute of an employee data object, which is grouped with other attributes associated with the employee data object pertaining to compensation. A second portion 954 of the example application user interface 950 shows in-progress user configuration of the condition. A user may add any number of conditions and operations when configuring an application trigger. Once an application trigger or any application object has been defined then associated instructions may be generated in a computer language.

Returning to FIG. 7, at 704, a computer system obtains input from the application user interface based on one or more of the selectable options. In an embodiment, user input associated with one or more selectable options based on organizational data 311 may be received or otherwise obtained based on user interaction with an application user interface. For example, one or more selectable options and/or other user input can be received or obtained as a user interacts with the application user interface (e.g., based on each interaction with the application user interface, based on interaction with particular controls of the application user interface, etc.). User input also can be received or obtained for evaluation based on a specific user request. For example, a user may provide one or more selections or other input via an application user interface and then submit the selections together at a single time. In other examples, input also may be received or otherwise obtained from an application user interface in various other ways.

At 706, a computer system analyzes the input associated with the application user interface. For example, the computer system may validate input from an application user interface to ensure that such input is complete and correct. The computer system also may use such input to refresh or update the application user interface. For example, one or more portions of the application user interface may be refreshed or otherwise updated with new information based on the user input from the application user interface. In one example, one or more selections of data objects associated with an application user interface may be analyzed and used to generate one or more new portions of the application user interface or another user interface associated with generating instructions in a computer language. In various examples, input from an application user interface may be used to dynamically update the application user interface in support of assisting a user with providing information for completing a configuration available via the application user interface. Input from an application user interface also may be used to dynamically generate or otherwise guide a user via a series of multiple application user interfaces that assist a user in providing configuration information to, for example, generate instructions in a computer language.

At 708, a computer system generates instructions in the custom computer language based on the input from the application user interface. In an embodiment, a computer system analyzes one or more selections, one or more statements, and/or any other input or information associated with an application user interface. For example, such selections, statements, input, and information may be analyzed based on organizational data 311, based on information that describes structure and relationships associated with the organizational data 311 (e.g., data structures 315), or based on any other information associated with an organizational data management system. The computer system then may generate the instructions in the custom computer language based on any one or more of input from an application user interface, organizational data 311, structure and/or relationships associated with the organizational data 311, and/or any other information (e.g., any other information associated with an organizational data management system or system of record).

At 710, a computer system stores the instructions generated in the custom computer language for use with a system of record that manages the organizational data. In an embodiment, generated instructions may be stored in one or more databases, or any other type of data store. For example, generated instructions may be stored in one or more databases or other data stores associated with an organizational data management system. In an example, instructions may be generated in a custom computer language and then deployed and enabled for use in an organizational data management system. Such generated instructions then may be executed based on organizational data 311 in the organizational data management system.

At 712, a computer system executes the instructions generated in the custom computer language based on the organizational data. For example, one or more instructions may cause an application or system (e.g., an organizational data management system that serves as a system of record for managing organizational data 311) to perform one or more operations internally, may cause the application or system to perform one or more operations in association with an external application or system (e.g., including one or more third-party applications based on respective integrations, etc.), or may cause the application or system to perform one or more operations both internally and with an external application or system. In an example, the one or more operations may include performing any operation available in a system of record, any operation available from an application provided for use with the system of record, and/or any operation available from a third-party application integrated with the system of record. Some examples of operations may include, but are not limited to, updating organizational data 311, executing one or more queries, advancing progression of a workflow, completing a workflow, assigning a task, updating status of a task, completing a task, initiating evaluation of another trigger, firing another trigger, approval of a request, denial of a request, generation of one or more alerts, transmission of one or more alerts, generation of one or more messages, transmission of one or more messages, generating and sending a request to another application, initiating an action or event in another application, installing an application on a user device, applying a software update to a user device, setting one or more configurations on a user device, setting one or more configurations for each of one or more applications provided to a user, setting one or more configurations for each of one or more applications on a user device, and/or performing any other types of actions within a system of record and/or across any number of applications.

Figure 10:
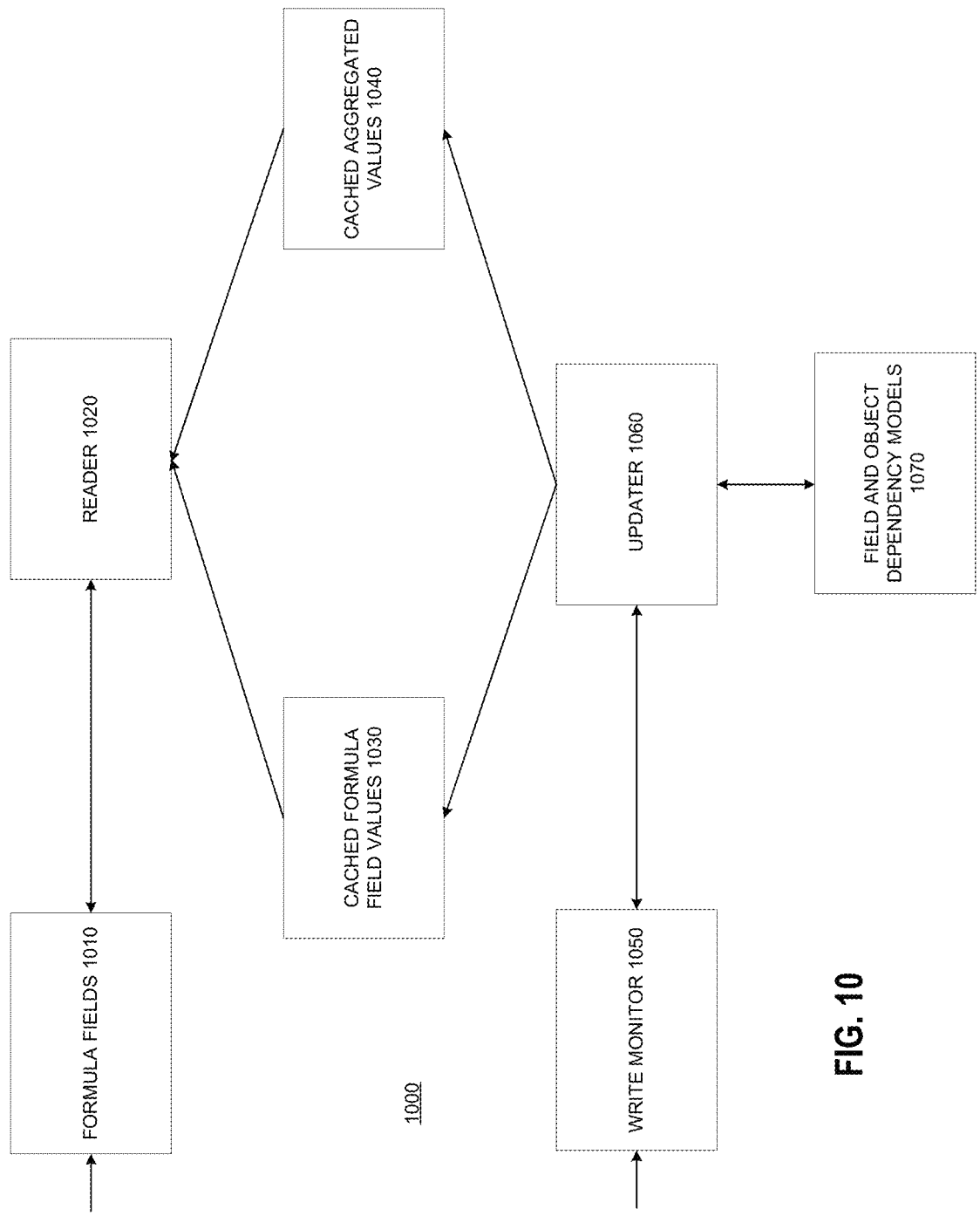
FIG. 10 depicts a flow diagram of an example computing environment to generate a formula field, according to example embodiments of the disclosure.

FIG. 10 depicts a flow diagram of an example computing environment to generate a formula field, according to example embodiments of the disclosure. The example flow diagram 1000 depicts example operations of the data manager 312 including functions of a write monitor 1050, updater 1060, and reader 1020 which may be associated with or integrated as part of the data manager 312. For example, values of formula fields 1010 may be generated or determined based on a reader 1020 which reads values associated with the formula field 1010, such as cached formula field values 1030 and cached aggregated values 1040. The write monitor 1050 may be configured to monitor writes to a database and use an index (e.g., reverse index) which maps dependencies to a formula field identifier to efficiently identify formula fields that need to be updated based on a value of a dependent field or object being updated. The updater 1060 may perform a full or partial update of formula fields based on field and object dependency models 1070 which provide the mapping information to formula fields. For example, a field dependency model may include information relating to a model, field, and organization which is associated with a particular formula field. For example, an object dependency model may include information relating to a model, field, organization, and object which is associated with a particular formula field when the particular formula field utilize the object. The updater 1060 may cache final and/or intermediate results when formula fields are evaluated (calculated) based on the updated value of an object and/or dependent field. For example, a final result of the formula field may be stored in cache as a model (e.g., using schema including an ID, calculated field ID, a derived model object reference field, and a value). For example, one or more intermediate results that are obtained in a process to obtain the final result of the formula field may also be stored in cache by updater 1060. As an example in the formula field CF1=2*annual_salary/SUM(annual_salaries in your department), the second part (aggregated annual salaries at department level) may be cached.

Reader 1020 may be configured to read a formula field's value in three different modes. For example, in a first mode the customer query language may be evaluated by the reader 1020 during a read time and all of the formula field values may be computed so as to return the most up-to-date values. For example, in a second mode the reader 1020 may read cached values for all of the formula field values so as to return a result quickly. For example, in a third mode (e.g., a hybrid mode) some values may be read from cache by reader 1020 while others are computed at read time. For example, in some implementations aggregated values are read from cache and remaining values are calculated in real-time. For example, in the example formula field CF1=2*annual_salary/SUM(annual_salaries in your department), the second part (aggregated value) may be fetched from cache and the remaining values are computed in real time. The three modes allow a user to trade-off between obtaining a result based on a response time at the expense of possible staleness and vice versa.

Figure 11A:
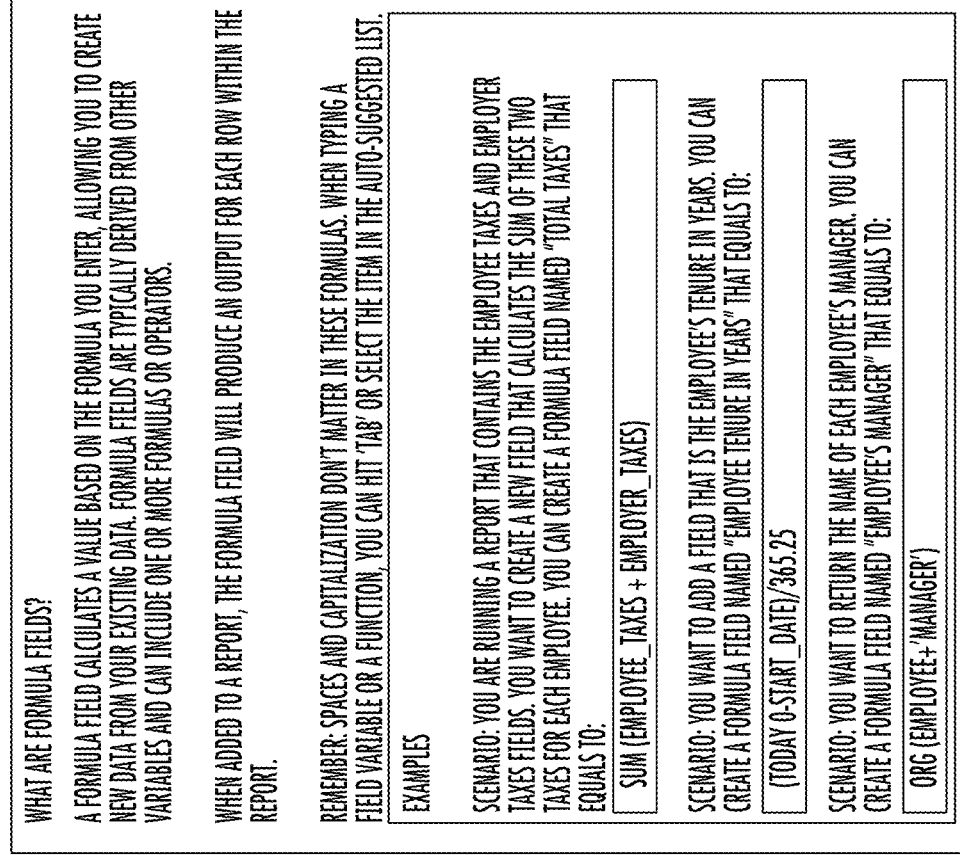
FIG. 11A depicts an illustration of an example application user interface with field assistance for generating instructions in a computer language, according to example embodiments of the disclosure.
Figure 11A:
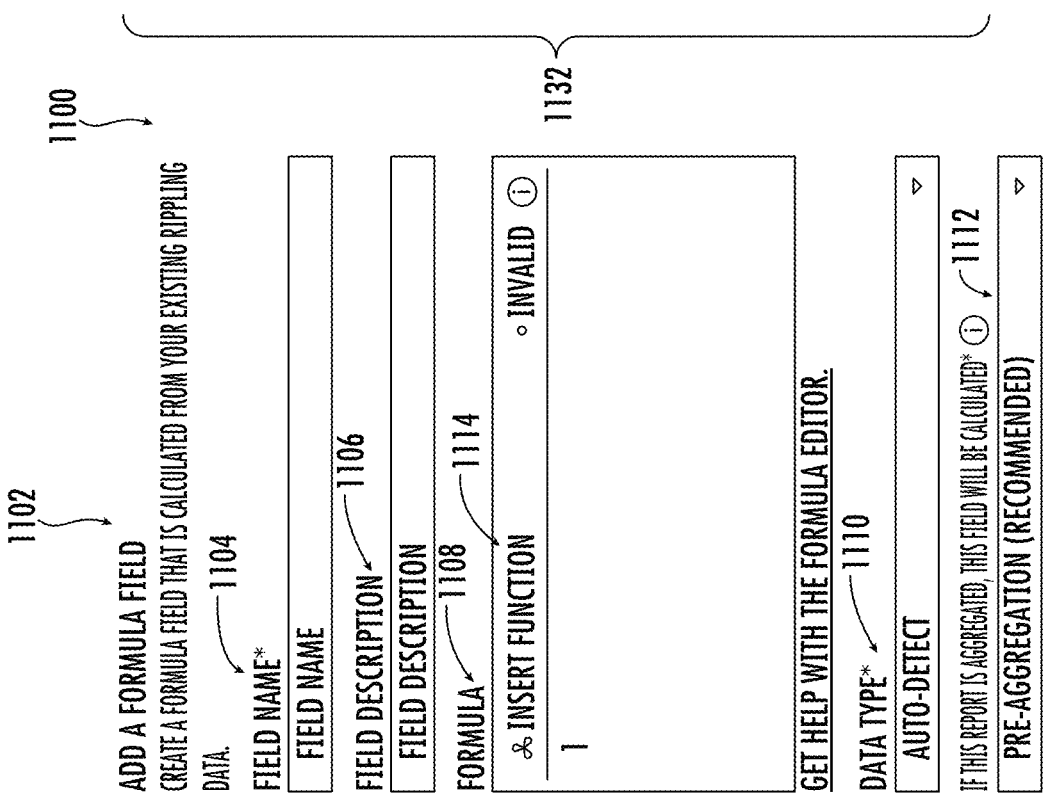

FIG. 11A depicts an illustration of an example application user interface 1100 with field assistance for generating instructions in a computer language, according to example embodiments of the disclosure. Example application user interface 1100 includes descriptive information 1102 about the interface, a field name input control 1104, field description input control 1106, a code editor 1108 (e.g., formula editor), a data type selection control 1110, an aggregation option control 1112, and an insert function control 1114.

In an embodiment, the descriptive information 1102 generally may provide information describing an application user interface. In example application user interface 1100, the descriptive information 1102 indicates that the application user interface is directed to configuring a formula field. For example, a formula field may be added to any data object associated with organizational data 311. A formula field calculates a value based on a formula entered by a user allowing the user to create new data (e.g., a new data object) from existing data which can be added to the object graph data structure. Formula fields may be derived from other variables and include one or more formulas or operators. When added to a report the formula field may produce an output for each row within the report. The field name input control 1104 generally enables a user to assign a name to a formula field. The field description input control 1106 generally enables a user to provide a brief description associated with a formula field. The code editor 1108 generally enables a user to enter statements in a custom query language. The insert function control 1114 generally enables a user to access a collection or library of functions graphically for selection and insertion into the code editor 1108. For example, the data manager 312 may intelligently suggest functions to be inserted in the code editor as a user types a word describing the desired function. For example, the data manager 312 may offer suggested syntax for defining a formula, for example, based on a location of a cursor in the user input 1142 area (see FIG. 11B) of the code editor 1108. The user input 1142 represents example input information entered into the code editor 1108 by a user. The code assist information 1144 provides graphical selections 1146 based on context of the user input 1142 for aiding a user in forming statements in the custom computer language. For example, code assist information 1144 may present relevant variables, functions, and or other information while excluding other irrelevant information based on existing context associated with an application user interface. The data type selection control 1110 is provided to enable a user to specify a data type for the formula field that is being created. In some examples, a user can access an application user interface for inserting a function based on selecting the insert function control 1114. Also, statements from the code editor 1108 may be processed by a custom language processing engine 318. For example, such statements may be compiled by a computer instruction compiler 319 and used to generate instructions in the custom computer language by a computer instruction generator 320. In some examples, such generated instructions may be expanded, optimized, and/or otherwise different in some way compared to certain types of simplified instructions that may be entered via the code editor. The aggregation option control 1112 may allow a user to specify whether certain information in the formula field will be aggregated before the report is generated (e.g., pre-aggregation) such that values from a cache will be read, or will be aggregated in response to a read operation. User interface 1100 also includes descriptive information 1132 which generally may provide information describing aspects of the application user interface. In example application user interface 1100, the descriptive information 1132 indicates a description about formula fields and example scenarios in which a formula field may be created.

In an embodiment, one or more templates may be provided or shared among users as a starting point for configuring statements or instructions in a custom computer language. Such code templates and/or any other types of templates may be provided or otherwise made available via a search interface. Also, such templates may be provided or otherwise made available via a navigable user interface that may include an organized list of folders or other objects that enable multiple different users to define, redefine, use, reuse, and/or perform any other types of activities relating to instructions in a computer language.

Figure 11B:
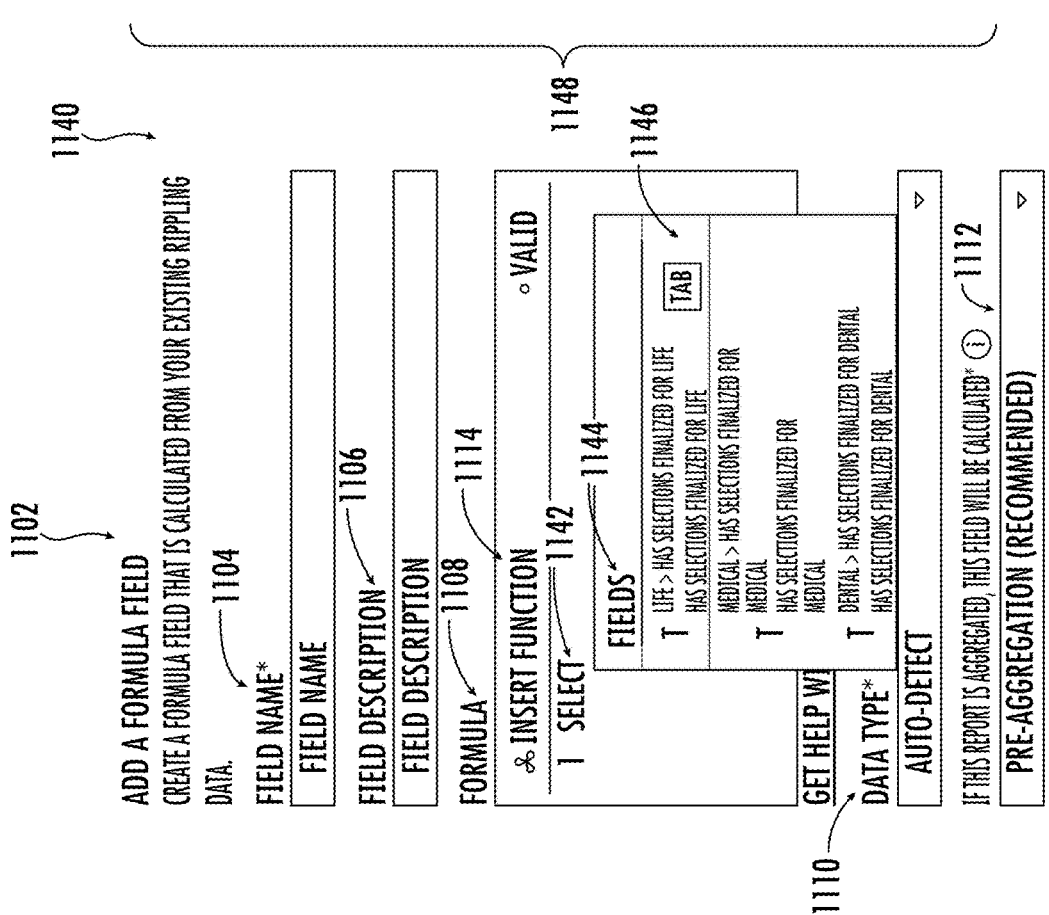
FIG. 11B depicts an illustration of an example application user interface with field assistance with browsing of available functions and associated information for generating instructions in a computer language, according to example embodiments of the disclosure.

FIG. 11B depicts an illustration of an example application user interface with field assistance with browsing of available functions and associated information for generating instructions in a computer language, according to example embodiments of the disclosure. Example application user interface 1140 includes the descriptive information 1102, the field name input control 1104, the field description input control 1106, the code editor 1108 (e.g., formula editor), the data type selection control 1110, the aggregation option control 1112, the insert function control 1114, and descriptive information 1148 as described above with respect to example application user interface 1100. In addition, example application user interface 1140 includes example user input 1142 in the code editor 1108, and pop-up code assist information 1146 based on context associated with the user input 1142 in the code editor 1108.

In an embodiment, a user begins to enter text associated with a "SELECT" function as user input 1142 into code editor 1108. Example application user interface 1140 receives and processes the user input. For example, an application user interface may, for example by itself or in conjunction with a server process, analyze user input 1142 as the user enters or during a pause after the user enters input into code editor 1108. In an example, the user input may be analyzed to determine and obtain relevant information that is to be provided via the application user interface based on context of the user input 1142. For example, the example application user interface 1140 can determine, obtain, and provide pop-up code assist information 1146 and/or detailed code assist information 1158 (see FIG. 11C), and/or any other type of code assist information based on context and user input 1142.

FIG. 11C depicts an illustration of an example application user interface with field assistance with browsing of available functions and associated information for generating instructions in a computer language, according to example embodiments of the disclosure. Example application user interface 1150 includes the descriptive information 1102, the field name input control 1104, the field description input control 1106, the code editor 1108 (e.g., formula editor), the data type selection control 1110, the aggregation option control 1112, and the insert function control 1114, as described above with respect to example application user interfaces 1100 and 1140.

Example application user interface 1150 includes code assist information 1158 regarding a syntax associated with the "SELECT" function. The code assist information 1158 may include instructions for specifying a function and provide example scenarios for implementing the "SELECT" function.

Numerous details are set forth in the foregoing description. However, it will be apparent to one skilled in the art having the benefit of this disclosure that the disclosure may be practiced without these specific details. In some instances, structures and devices are shown in block diagram form, rather than in detail, to avoid obscuring the disclosure.

Some portions of the detailed description have been presented in terms of processes and symbolic representations of operations on data bits within a computer memory. Here, a process can include a self-consistent sequence of operations leading to a result. The operations can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the subject matter has been described in detail with respect to various examples, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the subject matter as would be readily apparent to one skilled in the art. For instance, features illustrated or described as part of one embodiment can be used with another embodiment to yield a still further embodiment. Thus, it is intended that the disclosure covers such alterations, variations, and equivalents.

What is claimed is:

1. A computer-implemented method for a data manager of an organizational data management platform, the method comprising:
    generating a formula field which includes one or more dependent fields, wherein the formula field is defined with respect to two or more data objects among a plurality of data objects of an object graph data structure, and evaluated using a query expression that makes reference to the object graph data structure associated with a set of organizational data stored in one or more databases;
    in response to a value of at least one of the one or more dependent fields changing to an updated value, searching for formula fields which include the at least one of the one or more dependent fields using a reverse index, and automatically updating a value of the formula field based on the searching and the updated value of the at least one of the one or more dependent fields; and
    enabling inclusion of the formula field in one or more of a report, a policy, a workflow, a trigger, or a rule.

2. The computer-implemented method of claim 1, wherein in response to the value of at least one of the one or more dependent fields changing to the updated value,
    caching the updated value of the at least one of the one or more dependent fields.

3. The computer-implemented method of claim 1, further comprising verifying, via a permissions system of the organizational data management platform, whether a user has permission to access information associated with each of the two or more data objects before generating the formula field, before allowing the two or more data objects to be included in the formula field, or before calculating a value of the formula field.

4. The computer-implemented method of claim 3, further comprising:
    in response to the user not having permission to access information associated with at least one of the two or more data objects, preventing the user from defining the formula field to include a field that accesses the information associated with the at least one of the two or more data objects,
    in response to the user not having permission to access information associated with at least one of the two or more data objects, omitting fields, from a selectable list of fields for defining the formula field, which access the information associated with the at least one of the two or more data objects, or
    in response to the user not having permission to access information associated with at least one of the two or more data objects, preventing the user from accessing a result of a calculation of the formula field which is based on the information associated with the at least one of the two or more data objects while enabling users having permission to access the information associated with each of the two or more data objects to access the result of the calculation of the formula field.

5. The computer-implemented method of claim 1, further comprising:
    monitoring each of the values of the one or more dependent fields according to a predetermined time interval to determine whether a corresponding value of the one or more dependent fields has changed.

6. The computer-implemented method of claim 1, further comprising:
    monitoring each of the values of the one or more dependent fields in response to a predetermined event occurring to determine whether a corresponding value of the one or more dependent fields has changed.

7. The computer-implemented method of claim 6, wherein the predetermined event includes one or more of an occurrence of a performance evaluation for an employee of the organization, a change in status of the employee, an event associated with a security belonging to the employee, and an event associated with a benefits enrollment period for the employee.

8. The computer-implemented method of claim 1, wherein generating the formula field includes granting permission to a user to overwrite a default formula field to define the formula field by at least one of deleting one or more fields of the default formula field, modifying one or more fields of the default formula field, or adding one or more fields to the default formula field.

9. The computer-implemented method of claim 1, further comprising:
    importing third-party data to the data manager of the organizational data management platform; and
    associating the third-party data with the object graph data structure by creating one or more custom data objects associated with the third-party data,
    wherein generating the formula field includes defining the formula field by incorporating one or more fields which reference at least one of the one or more custom data objects.

10. The computer-implemented method of claim 1, wherein enabling inclusion of the formula field in the workflow includes modifying a default workflow to include the formula field.

11. The computer-implemented method of claim 1, further comprising performing one or more operations associated with the one or more of the report, the policy, the workflow, the trigger, or the rule, based on the updated value of the formula field.

12. The computer-implemented method of claim 1, further comprising, when the formula field is included in the trigger, in response to automatically updating the value of the formula field based on the updated value of the at least one of the one or more dependent fields, determining whether the trigger is triggered based on the updated value of the formula field.

13. The computer-implemented method of claim 1, wherein generating the formula field includes creating one or more additional data objects corresponding to the formula field, and adding the one or additional data objects to the object graph data structure.

14. A computer system for a data manager of an organizational management platform, the computer system comprising:
one or more processors;
one or more databases that collectively store a set of organizational data associated with an organization, wherein the set of organizational data comprises an object graph data structure comprising a plurality of data objects associated with the set of organizational data; and
one or more non-transitory computer-readable media that collectively store instructions that, when executed by the one or more processors, cause the computer system to perform operations, the operations including:
generating a formula field which includes one or more dependent fields, wherein the formula field is defined with respect to two or more data objects among the plurality of data objects of the object graph data structure and evaluated using a query expression that makes reference to the object graph data structure;
in response to a value of at least one of the one or more dependent fields changing to an updated value, searching for formula fields which include the at least one of the one or more dependent fields using a reverse index, and automatically updating a value of the formula field based on the searching and the updated value of the at least one of the one or more dependent fields; and
enabling inclusion of the formula field in one or more of a report, workflow, and trigger.

15. The computer system of claim 14, wherein in response to the value of at least one of the one or more dependent fields changing to the updated value, the operations further include:
caching the updated value of the at least one of the one or more dependent fields.

16. The computer system of claim 14, further comprising:
a permissions system configured to store data associated with permissions access to the plurality of data objects associated with the set of organizational data, with respect to users associated with the organizational management platform, and
wherein the operations further include:
verifying, via the permissions system, whether a user has permission to access information associated with the one or more data objects before generating the formula field, before allowing the one or more data objects to be included in the formula field, or before calculating a value of the formula field.

17. The computer system of claim 14, wherein the operations further include:
monitoring each of the values of the one or more dependent fields according to a predetermined time interval or in response to a predetermined event occurring, to determine whether a corresponding value of the one or more dependent fields has changed.

18. The computer system of claim 14, wherein the operations further include:
importing third-party data to the data manager of the organizational data management platform, and
associating the third-party data with the object graph data structure by creating one or more custom data objects associated with the third-party data,
wherein generating the formula field includes defining the formula field by incorporating one or more fields which reference at least one of the one or more custom data objects.

19. One or more tangible non-transitory computer-readable media storing computer-readable instructions that, when executed by one or more processors, cause the one or more processors to:
generate a formula field which includes one or more dependent fields, wherein the formula field is defined with respect to two or more data objects among a plurality of data objects of a object graph data structure, and evaluated using a query expression that makes reference to an object graph data structure comprising a plurality of data objects associated with a set of organizational data stored in one or more databases;
in response to a value of at least one of the one or more dependent fields changing to an updated value, search for formula fields which include the at least one of the one or more dependent fields using a reverse index, and automatically update a value of the formula field based on the search and the updated value of the at least one of the one or more dependent fields; and
enable inclusion of the formula field in one or more of a report, a policy, a workflow, a trigger, or a rule.

* * * * *

UNITED STATES PATENT AND TRADEMARK OFFICE
CERTIFICATE OF CORRECTION

PATENT NO. : 11,614,924 B1
APPLICATION NO. : 17/953746
DATED : March 28, 2023
INVENTOR(S) : Ajaya Kumar Agrawal et al.

Page 1 of 1

It is certified that error appears in the above-identified patent and that said Letters Patent is hereby corrected as shown below:

On the Title Page

In the first Column under item (73) "Assignee", after the word "PEOPLE" please delete "CENIER" and replace it with the word "CENTER" instead.

Signed and Sealed this
Twentieth Day of June, 2023

Katherine Kelly Vidal
*Director of the United States Patent and Trademark Office*